United States Patent
Saxena et al.

(10) Patent No.: US 11,687,583 B2
(45) Date of Patent: Jun. 27, 2023

(54) INFORMATION RETRIEVAL SYSTEM AND METHOD OF INFORMATION RETRIEVAL

(71) Applicant: SAMSUNG ELECTRONICS CO., LTD., Suwon-si (KR)

(72) Inventors: Ruchika Saxena, Noida (IN); Kapil Sachdeva, Noida (IN); Maneesh Jain, Noida (IN); Arun Kumar Singh, Noida (IN)

(73) Assignee: SAMSUNG ELEOTRONICC CO., LTD, Suwon-si (KR)

( * ) Notice: Subject to any disclaimer, the term of this patent is extended or adjusted under 35 U.S.C. 154(b) by 0 days.

(21) Appl. No.: 17/752,515

(22) Filed: May 24, 2022

(65) Prior Publication Data

US 2022/0382805 A1 Dec. 1, 2022

Related U.S. Application Data

(63) Continuation of application No. PCT/KR2022/006962, filed on May 16, 2022.

(30) Foreign Application Priority Data

May 24, 2021 (IN) .............................. 202111023048
Aug. 21, 2021 (IN) .............................. 202111023048

(51) Int. Cl.
*G06F 16/00* (2019.01)
*G06F 16/583* (2019.01)
(Continued)

(52) U.S. Cl.
CPC ........ *G06F 16/5846* (2019.01); *G06F 16/532* (2019.01); *G06F 16/538* (2019.01)

(58) Field of Classification Search
CPC ... G06F 16/5846; G06F 16/532; G06F 16/538
See application file for complete search history.

(56) References Cited

U.S. PATENT DOCUMENTS 5,768,578 A 6/1998 Kirk et al.
7,437,672 B2 10/2008 Myers
(Continued)

FOREIGN PATENT DOCUMENTS

EP 0 774 722 A2 5/1997
JP 6710007 B1 6/2020
(Continued)

OTHER PUBLICATIONS

International Search Report (PCT/ISA/220 and PCT/ISA/210) and Written Opinion (PCT/ISA/237) dated Aug. 12, 2022 by the International Searching Authority in International Application No. PCT/KR2022/006962.

*Primary Examiner* — Jared M Bibbee
(74) *Attorney, Agent, or Firm* — Sughrue Mion, PLLC

(57) ABSTRACT

A system for retrieving information from an instructional document, includes a processor configured to: receive a query from a user; compare the query with one or more text sections in the instructional document; obtain, from the one or more text sections, top x text sections relevant to the query using a pre-trained encoder; compare the query with one or more images in the instructional document; obtain, from the images, top y images relevant to the query; generate top y image-text sections based on the top y images; obtain top k sections from the top x text sections and the top y image-text sections; obtain one or more most relevant sections from the top k sections using a domain-specific pre-trained encoder and a sequential classification model; and generate an answer based on the one or more most relevant sections and device context information using the domain-specific pre-trained encoder.

20 Claims, 19 Drawing Sheets

(51) Int. Cl.
*G06F 16/538* (2019.01)
*G06F 16/532* (2019.01)

(56) References Cited

U.S. PATENT DOCUMENTS

| | | |
|---|---|---|
| 9,678,618 B1 | 6/2017 | Schrock et al. |
| 2004/0249774 A1* | 12/2004 | Caid .................. G06F 16/5838 706/14 |
| 2015/0286685 A1 | 10/2015 | Coll et al. |
| 2019/0179842 A1* | 6/2019 | Shah ..................... G06F 40/258 |
| 2020/0293168 A1* | 9/2020 | Kim ...................... G06F 3/0488 |
| 2021/0240776 A1* | 8/2021 | Jawagal ................ G06F 16/313 |

FOREIGN PATENT DOCUMENTS

| | | |
|---|---|---|
| JP | 6831522 B2 | 2/2021 |
| WO | 2009/143395 A1 | 11/2009 |
| WO | 2021/001047 A1 | 1/2021 |

\* cited by examiner

FIG. 14
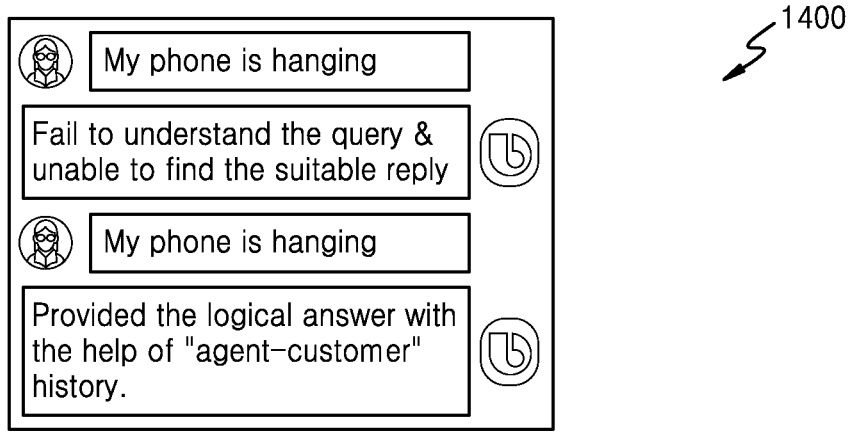
- Samsung Chabot gives "Fail to understand" if sufficient variations of paraphrases not exists in FAQ.
- Using our innovation, we extract the best answers from the 'agent-customer conversation History log'
Precise Answer from Chat-bot
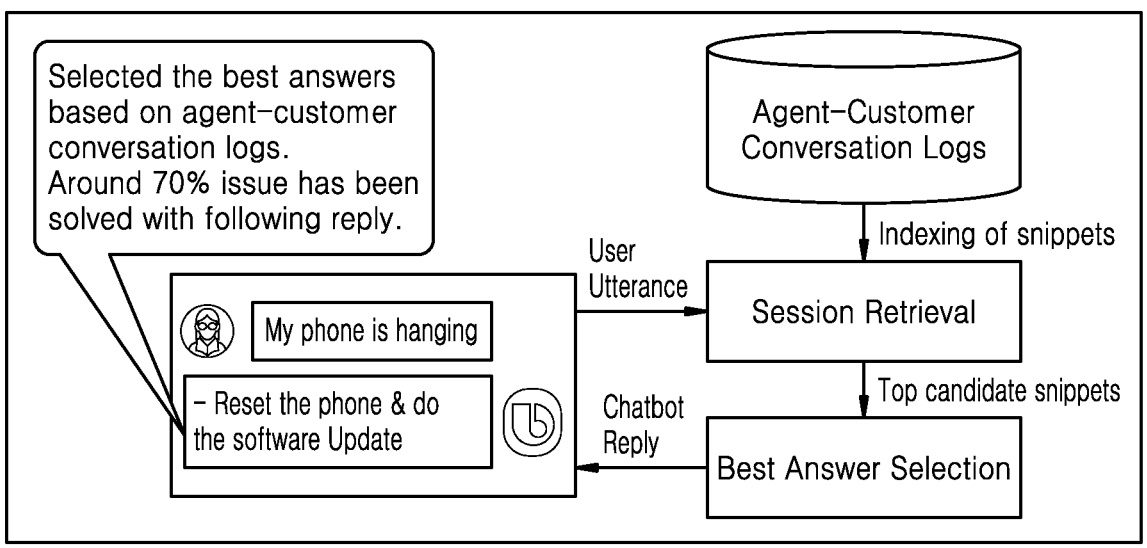

FIG. 16

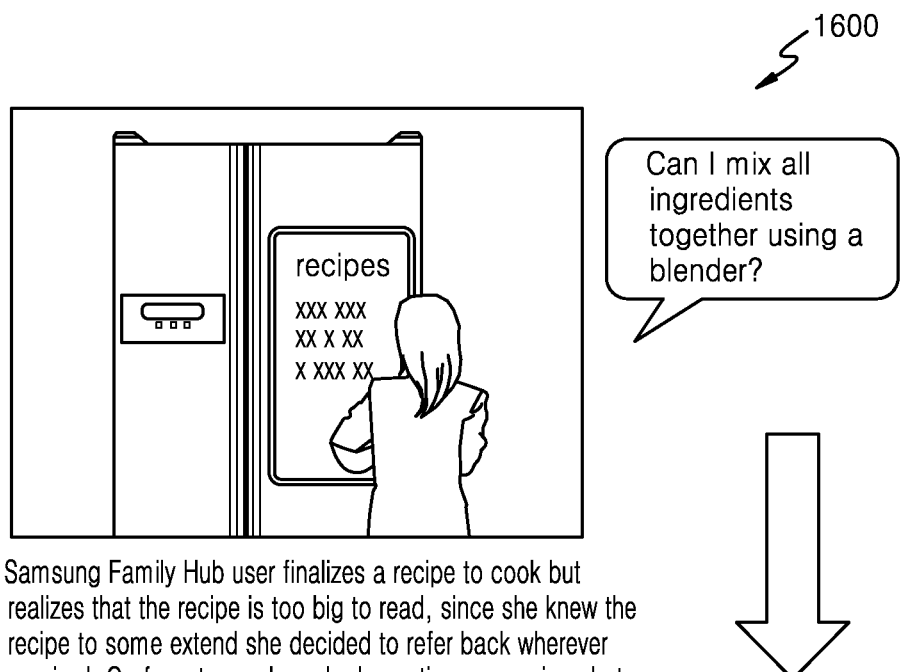

- Samsung Family Hub user finalizes a recipe to cook but realizes that the recipe is too big to read, since she knew the recipe to some extend she decided to refer back wherever required. On few steps, she asked questions on recipes but still got many steps to read through.

Precise Answer from instruction manual:
- A step by step recipe can be passed to information retrieval model along with user query.
- User query is search through recipe sections and images
- Answer is further refined by reading device context like device type, form factor, sensor information etc
- Since the device supports display, answer is shown in multimodality with both text and image wherever applicable
- User is happy to get to-the-point information

- Mix dry and wet ingredients separately. Pour wet into dry and hand whisk them

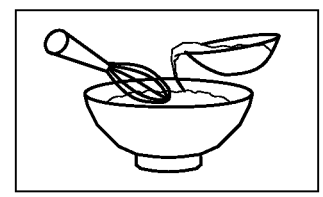

Multi-modal precise answer

INFORMATION RETRIEVAL SYSTEM AND METHOD OF INFORMATION RETRIEVAL

CROSS-REFERENCE TO RELATED APPLICATIONS

This application is a bypass continuation application of International Application No. PCT/KR2022/006962, filed on May 16, 2022, which is based on and claims priority to Indian Patent Application No. 202111023048, filed on May 24, 2021, and Indian Patent Application No. 202111023048, filed on Aug. 21, 2021, in the Indian Patent Office, the disclosures of which are incorporated by reference herein in their entireties.

BACKGROUND

1. Technical Field

The present disclosure relates generally to information retrieval systems and particularly to a system and a method for retrieving information from multiple sections within an instructional document.

2. Description of Related Art

Most smart electronic devices are accompanied with pre-installed instruction manuals or electronic manuals (e-manuals). For instance, smartphones are equipped with a tips application and smart televisions are equipped with a help section to provide assistance to users regarding usage of the electronic devices. These e-manuals generally have long assertive sentences. If a user searches for a query in the e-manual, an answer to the query may involve information from multiple sections of the e-manual. These sections may be contiguous or non-contiguous. Often, the contiguous sections may not be related to each other but may be related to a parental section, thereby leading to long-range dependencies. As such, retrieving the answer in such complex e-manuals may be difficult.

Related art searching techniques result in returning all occurrences of one or more terms of the query within the e-manual. It is likely that all the occurrences of the terms in the query are generally not relevant to the query. That is, the answer provided by the conventional searching techniques may not be to-the-point or definitive.

Retrieving information from instructional corpora such as e-manuals has been far less studied than open domain factoid context-based information retrieval. Most of the e-manuals provide a search-based interface which is not capable of answering all the queries posted by the user.

Since the e-manuals usually include content like paragraphs, instructions, and sections, the user finds it troublesome to check and look for the answer or steps for resolution of the query. Therefore, there is a need to provide assistance to the user in using and searching the e-manuals.

Many related art techniques attempt to overcome aforesaid problems faced by the user in using the e-manuals of the devices. In one related art technique, information search in the e-manual returns a list of pages with keyword matches or with semantic similarity with the query. Here, the user may find it cumbersome and difficult to read multiple pages to get the answer to the query. Owing to the difficulty, the user may stop using the e-manual and may call a customer support center for receiving a definitive answer to the query. This may lead to increased call volumes at the customer support centers for issues which could be handled by an efficient information retrieval system in the e-manual.

There are many limitations with the related art techniques. For instance, the e-manuals typically provide lengthy instructions structured in a sequential fashion explaining various uses of the electronic device. This often poses challenges in building the information retrieval system because the answer to the query may lie in multiple disjoint portions in the e-manual.

One related art technique includes a system and method for indexing, querying, and retrieving information in an on-line network. This technique only focuses on information retrieval from a contiguous section.

Another related art technique provides an improved information retrieval system user interface for retrieving information from a plurality of sources and for storing information source descriptions in a knowledge base. However, this technique does not teach or disclose retrieving information from non-contiguous sections.

Yet another related art technique includes a method that facilitates generating a number of candidate passages from a corpus that answer an input query and finds the correct resulting answer by collecting supporting evidence from multiple passages. However, this technique does not teach or disclose information retrieval from a long-range dependency.

Therefore, there is a need for a technique of information retrieval from multiple non-contiguous sections within an instructional document.

SUMMARY

Provided are a system for retrieving information from an instructional document and an information retrieval method for retrieving information from an instructional document.

According to an aspect of the disclosure, a system for retrieving information from an instructional document may include a memory storing at least one instruction; and at least one processor configured to execute the at least one instruction to: receive a query from a user; compare the query with one or more text sections in the instructional document; obtain, from the one or more text sections, top x text sections relevant to the query using a pre-trained encoder; compare the query with one or more images in the instructional document; obtain, from the images, top y images relevant to the query; generate top y image-text sections based on the top y images; obtain top k sections from the top x text sections and the top y image-text sections; obtain one or more most relevant sections from the top k sections using a domain-specific pre-trained encoder and a sequential classification model; obtain device context information; and generate an answer based on the one or more most relevant sections and the device context information using the domain-specific pre-trained encoder.

The at least one processor may be further configured execute the at least one instruction to: replace at least one part of the answer corresponding to at least one of the top y image-text sections with at least one image of the top y images corresponding to the top y image-text sections; correct at least one part of the answer corresponding to at least one of the top x text sections grammatically and/or semantically to generate at least one corrected text; and generate a final answer that includes the at least one image of the top y images and the at least one corrected text.

The system may further include an output interface configured to provide the final answer to the user.

The pre-trained encoder may be a Bidirectional Encoder Representations from Transformers (BERT) model trained on the instructional document.

The BERT model may be combined with Term Frequency-Inverse Document Frequency (TF-IDF) to train on the instructional document.

The at least one processor may be further configured to execute the at least one instruction to: obtain a text similarity score for each text section based on a comparison between the text section and the query; and obtain x text sections having highest text similarity scores as the top x text sections.

The at least one processor may be further configured to execute the at least one instruction to: convert the query and the one or more images into a common latent vector space to generate a query vector and one or more image vectors; obtain an image similarity score for each pair of the query vector and an image vector of the one or more image vectors and obtain y images having highest image similarity scores as the top y images.

The at least one processor may be further configured to execute the at least one instruction to compare the text similarity scores of the top x text sections and the image similarity scores of the top y images to determine the top k sections.

The domain-specific pre-trained encoder may be a Robustly Optimized BERT Pre-training Approach (RoBERTa) model trained on the instructional document.

The domain-specific pre-trained encoder may be trained simultaneously to obtain the one or more most relevant sections and generate the answer using the RoBERTa model.

The RoBERTa model may be trained using at least one of: a linearly decreasing learning rate technique, or an elastic weight consolidation technique.

The at least one processor may be further configured to execute the at least one instruction to obtain the one or more most relevant sections and generate the answer by performing sentence-wise classification and token-wise classification using a task-specific layer of the sequential classification model.

An average loss in obtaining the one or more most relevant sections and generating the answer may be provided as a multi-task loss to a task-specific layer of the sequential classification model.

At least one of the one or more text sections and the one or more images may be non-contiguous.

The device context information is indicative of at least one of: sensor states, events, or port values.

The at least one processor may be further configured to execute the at least one instruction to: obtain one or more model weights of the domain-specific pre-trained encoder; and train the sequential classification model based on the one or more model weights.

The at least one processor may be further configured to execute the at least one instruction to convert a voice input into text format to generate the query.

According to another aspect of the disclosure, a method of retrieving information from an instructional document may include receiving, by at least one processor, a query from a user; comparing, by the at least one processor, the query with one or more text sections in the instructional document; obtaining, by the at least one processor and from the one or more text sections, top x text sections relevant to the query using a pre-trained encoder; comparing, by the at least one processor, the query with one or more images in the instructional document; obtaining, by the at least one processor and from the one or more images, top y images relevant to the query; generating, by the at least one processor, top y image-text sections based on the top y images; obtaining, by the at least one processor, top k sections from the top x text sections and the top y image-text sections; obtaining, by the at least one processor, one or more most relevant sections from the top k sections using a domain-specific pre-trained encoder and a sequential classification model; obtaining, by the at least one processor, device context information; and generating, by the at least one processor, an answer based on the one or more most relevant sections and the device context information using the domain-specific pre-trained encoder.

The method may further include replacing, by the at least one processor, at least one part of the answer corresponding to at least one of the top y image-text sections with at least one image of the top y images corresponding to said top y image-text sections; correcting, by the at least one processor, at least one part of the answer corresponding to at least one of the top x text sections grammatically and/or semantically for generating at least one corrected text; and generating, by the at least one processor, a final answer that includes the at least one image of the top y images and the at least one corrected text.

The method may further include providing, by the at least one processor, the final answer to the user.

The pre-trained encoder may be a Bidirectional Encoder Representations from Transformers (BERT) model trained on the instructional document.

The BERT model is combined with Term Frequency-Inverse Document Frequency (TF-IDF) to train on the instructional document.

The method may further include obtaining, by the at least one processor, a text similarity score for each text section based on a comparison between the text section and the query; and obtaining, by the at least one processor, x text sections having highest text similarity scores as the top x text sections.

The method may further include converting, by the at least one processor, the query and the one or more images into a common latent vector space to generate a query vector and one or more image vectors; obtaining, by the at least one processor, an image similarity score for each pair of the query vector and an image vector of the one or more image vectors; and obtaining, by the at least one processor, y images having highest image similarity scores as the top y images.

The domain-specific pre-trained encoder is a Robustly Optimized BERT Pre-training Approach (RoBERTa) model trained on the instructional document.

The method may further include training the domain-specific pre-trained encoder simultaneously to obtain the one or more most relevant sections and generate the answer using the RoBERTa model.

The RoBERTa model is trained using at least one of: a linearly decreasing learning rate technique or an elastic weight consolidation technique.

The method may further include comprising performing sentence-wise classification and token-wise classification using a task-specific layer of the sequential classification model to obtain the one or more most relevant sections and generate the answer.

An average loss in obtaining the one or more most relevant sections and generating the answer may be provided as a multi-task loss to a task-specific layer of the sequential classification model.

At least one of the one or more text sections and the one or more images may be non-contiguous.

The device context information may be indicative of at least one of: sensor states, events, or port values.

The method may further include obtaining, by the at least one processor, one or more model weights of the domain-specific pre-trained encoder; and training, by the at least one processor, the sequential classification model based on the one or more model weights.

The method may further include converting, by the at least one processor, a voice input into text format for generating the query.

According to another aspect of the disclosure, a non-transitory computer-readable medium may store instructions that, when executed by one or more processors of an electronic device, cause the one or more processors to: receive a query from a user; compare the query with one or more text sections in an instructional document; obtain, from the one or more text sections, top x text sections relevant to the query using a pre-trained encoder; compare the query with one or more images in the instructional document; obtain, from the images, top y images relevant to the query; generate top y image-text sections based on the top y images; obtain top k sections from the top x text sections and the top y image-text sections; obtain one or more most relevant sections from the top k sections using a domain-specific pre-trained encoder and a sequential classification model; obtain device context information; and generate an answer based on the one or more most relevant sections and the device context information using the domain-specific pre-trained encoder.

BRIEF DESCRIPTION OF THE DRAWINGS

The above and other objects, features, and advantages of the present disclosure will be more clearly understood from the following detailed description taken in conjunction with the accompanying drawings, in which:

FIG. 14 is a diagram showing a use case for a chat bot according to an embodiment.

FIG. 16 is a diagram showing a use case for a family hub in according to an embodiment.

Figure 1:
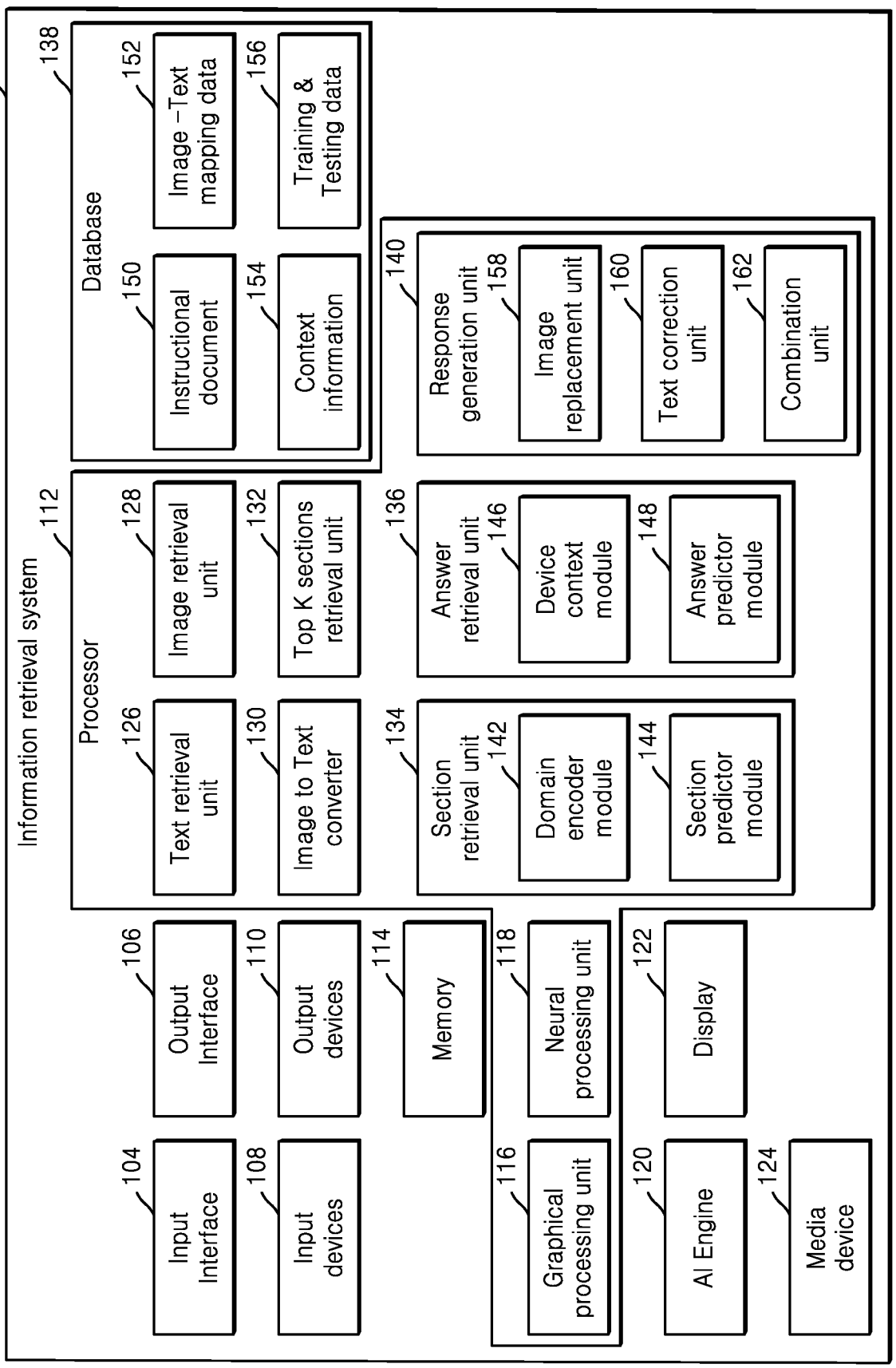
FIG. 1 is a schematic block diagram of an information retrieval system according to an embodiment.

It should be appreciated by those skilled in the art that any block diagram herein represents conceptual views of illustrative systems embodying the principles of the present invention. Similarly, it will be appreciated that any flow chart, flow diagram, and the like represent various processes which may be substantially represented in computer readable medium and so executed by a computer or processor, whether or not such computer or processor is explicitly shown.

DETAILED DESCRIPTION

Reference will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments.

The embodiments herein provide an information retrieval system for retrieving information from an instructional document and an information retrieval method for retrieving information from an instructional document.

In the following description, for purpose of explanation, specific details are set forth in order to provide an understanding of embodiments. It will be apparent, however, to one skilled in the art that embodiments may be practiced without these details.

One skilled in the art will recognize that implementations or embodiments of the present disclosure, some of which are described below, may be incorporated into a number of systems. However, the systems and methods are not limited to the specific embodiments described herein.

Further, structures and devices shown in the figures are illustrative of exemplary embodiments and are meant to avoid obscuring of the present disclosure.

It should be noted that the description merely illustrates the principles of the present disclosure. It will thus be appreciated that those skilled in the art will be able to devise various arrangements that, although not explicitly described herein, embody the principles of the present disclosure. Furthermore, all examples recited herein are principally intended expressly to be only for explanatory purposes to help the reader in understanding the principles of the disclosure and the concepts contributed by the inventor(s) to furthering the art and are to be construed as being without limitation to such specifically recited examples and conditions. Moreover, all statements herein reciting principles, aspects, and embodiments of the disclosure, as well as specific examples thereof, are intended to encompass equivalents thereof.

Throughout this application, with respect to all reasonable derivatives of such terms, and unless otherwise specified (and/or unless the particular context clearly dictates otherwise), each usage of "a" or "an" is meant to be read as "at least one" and "the" is meant to be read as "the at least one."

Also, it is to be understood that the terms "include" or "have" are intended to indicate the existence of elements disclosed in the specification, and are not intended to preclude the possibility that one or more other elements may exist or may be added.

As used herein, expressions such as "at least one of," when preceding a list of elements, modify the entire list of elements and do not modify the individual elements of the list. For example, the expressions "at least one of a, b, and c," and "at least one of a, b, or c" should be understood as including only a, only b, only c, both a and b, both a and c, both b and c, or all of a, b, and c.

Throughout the specification, terms "first", "second", and the like are used to distinguish one component from another, without indicating alignment order, manufacturing order, or importance of the components.

The information retrieval system and method retrieve information from an instructional document having multiples sections. The sections may include text sections and images. The text sections and images may be contiguous or non-contiguous. A query may be received from a user and one or more text sections and images relevant to the query may be obtained based on the query. Multi-level comparisons of the relevant sections may be performed to determine the sections that are most relevant to the query. An answer may be constructed based on the most relevant sections. The constructed answer may be corrected and refined and a final answer may be provided to the user.

FIG. 1 is a schematic block diagram of an information retrieval system 102 according to an embodiment. The information retrieval system 102 includes an input interface 104, an output interface 106, one or more input devices 108, one or more output devices 110, a processor 112 (or multiple processors), a memory 114, an Artificial Intelligence (AI) engine 120, a display 122, a media device 124, and a database 138. The processor 112 also includes a graphical processing unit 116, a neural processing unit 118, a text retrieval unit 126, an image retrieval unit 128, an image to text converter 130, a top k sections retrieval unit 132, a section retrieval unit 134, an answer retrieval unit 136, and a response generation unit 140. The section retrieval unit 134 includes a domain encoder module 142 and a section predictor module 144. The answer retrieval unit 136 includes a device context module 146 and an answer prediction module 148. The database 138 stores an instructional document 150, an image-text mapping data 152, a context information 154, and a testing and training data 156.

The memory 114 stores computer readable instructions which when executed by the processor 112 cause the processor 112 to perform the information retrieval method according to an embodiment. The graphical processing unit 116 and the neural processing unit 118 are configured to aid to accelerate the processing speed of the information retrieval system 102. The processor 112 may use the AI engine 120 to perform various artificial engine and machine learning functions.

The information retrieval system 102 may be implemented in various types of electronic devices such as, but not limited to, smartphones, tablets, home appliances, smart televisions, smart monitors, and other such electronic devices. The information retrieval system 102 may provide solutions to one or more queries of a user of the electronic device. In that, the information retrieval system 102 may generate an answer in response to a query received from the user based on the instructional document 150 stored in the database 138. The instructional document 150 may be an e-manual for the electronic device. The instructional document 150 includes multiple sections. The sections include text sections and images.

The input unit 104 may receive the query from the user by way of the input devices 108. Examples of the input devices 108 include, but are not limited to keyboard, mouse, camera, microphone, etc. When the user provides a voice input, the input unit 104 may receive the voice input by way of the microphone and converts the voice input into text form to generate the query.

The text retrieval unit 126 may receive the query and may compare the query with the text sections in the instructional document 150. The text retrieval unit 126 may determine a text similarity score for each text section of the instructional document 150. The similarity of the text section is indicative of a degree of similarity and/or relevancy between the query and the text section. The text retrieval unit 126 may determine x test sections having highest text similarity scores as top x test sections.

The image retrieval unit 128 may convert the query into a common latent vector space to generate a query vector. The image retrieval unit 128 may convert the images of the instructional document 150 into the common latent vector space to generate the image vectors corresponding to the images. The image retrieval unit 128 may determine an image similarity score for each image based on the image vector of the image and the query vector. The similarity of the image may be indicative of a degree of similarity and/or relevancy of the image with the query. The image retrieval unit 128 determines y images having highest image similarity scores as the top y images.

The image to text converter 130 may convert the top y images into text format to generate top y image-text sections.

The top k sections retrieval unit 132 may determine the top k sections from the top x text sections and the top y image-text sections. In that, the top k sections retrieval unit 132 may compare and/or rank the text similarity scores and/or the image similarity scores of the top x text sections and the top y images to determine the top k sections. Here, the top k sections may include a combination of any number of text sections and image-text sections.

The section retrieval unit 134 may determine most relevant sections from the top k sections using the domain encoder module 142 and the section predictor module 144.

The answer retrieval unit 148 may receive the context information 154 and the most relevant sections. The answer retrieval unit 148 may generate the answer based on the context information 154 and the most relevant sections using the domain encoder module 142. The answer includes one or more parts. Each part of answer corresponds to one of the sections of the most relevant sections. That is, each part of the answer corresponds to one or more of the text sections or the image-text sections.

The response generation unit 140 may correct and/or refine the answer. The image replacement unit 146 may replace a part of the answer corresponding to an image-text section with corresponding image. The text correction unit 160 may correct a part of the answer corresponding to a text section grammatically and/or semantically to generate a corrected text. Thereafter, the combination unit 162 may combine the corrected texts and the replaces the images to generate a final answer.

The output unit 106 may receive the final answer and may provide the final answer to the user using the output devices 110. In an example, the output unit 106 may display the answer on the display 122.

Figure 2:
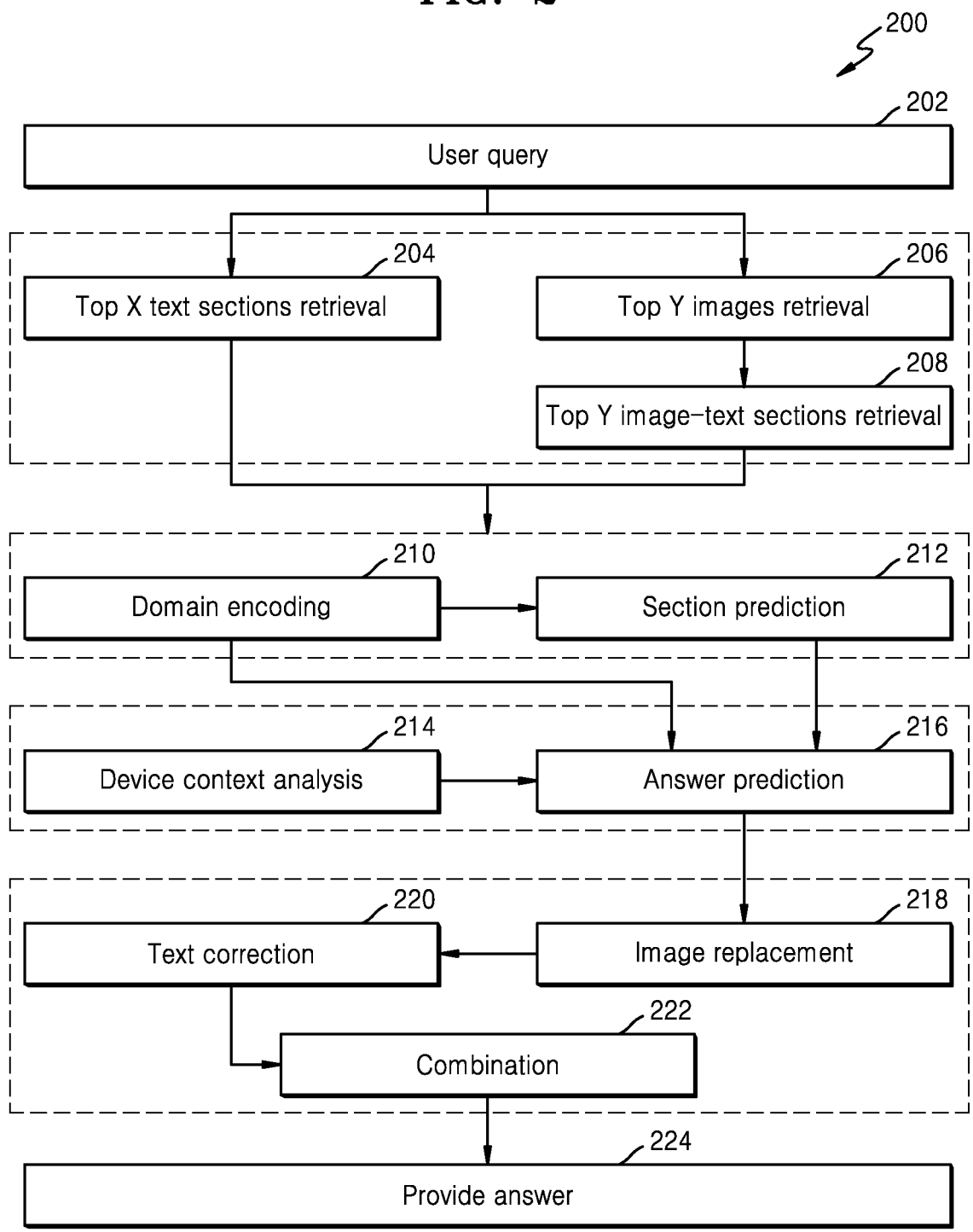
FIG. 2 is a flow diagram of an information retrieval method according to an embodiment.

FIG. 2 is a flow diagram 200 of an information retrieval method according to an embodiment.

At step 202, the input unit 104 may receive the query. In an example, the user query may be a sentence, a paragraph, or a sequence of words. Here, to reduce search space and to provide only a few relevant sections for the query, the information retrieval system 102 may use a semi-supervised information retrieval method which is a combination of two retrieval methods: a text retrieval method and an image retrieval method.

Figure 4:
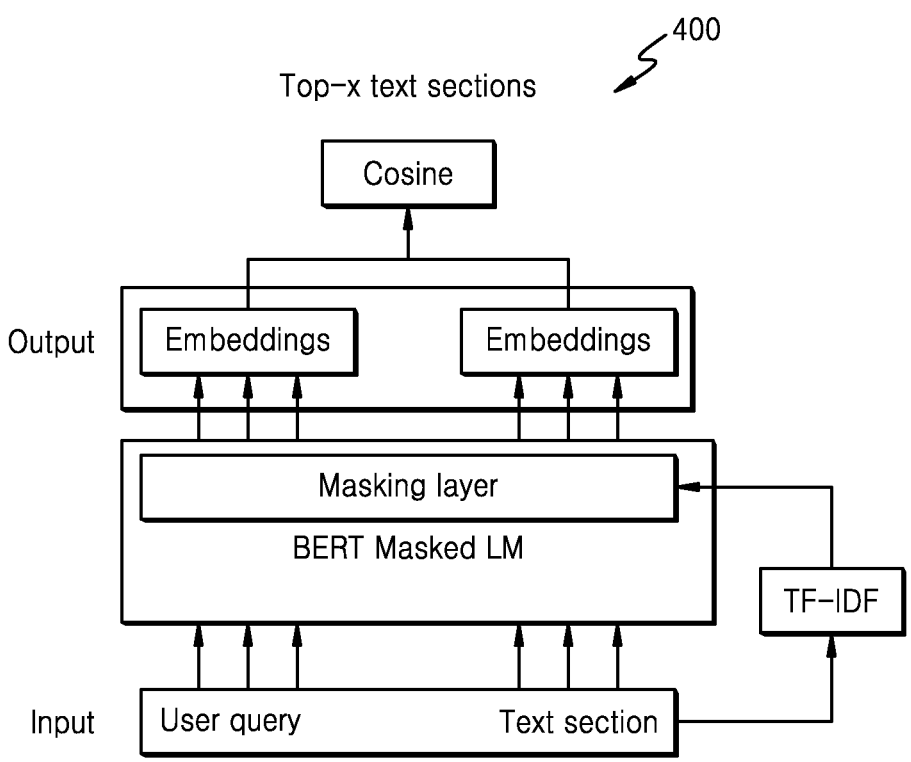
FIG. 4 is a diagram of a pre-trained encoder for retrieving top x text sections according to an embodiment.

At step 204, the text retrieval unit 126 may perform the text retrieval method. The text retrieval unit 126 may determine the top x text sections. In one embodiment, the text retrieval unit 126 employs a Bidirectional Encoder Representations from Transformers (BERT) model and Term Frequency-Inverse Document Frequency (TF-IDF) model. Through an attention mechanism of the BERT model, a distance between two words at any position is converted to 1. This solves long-term dependence problem. A TF-IDF score is applied in the BERT mask layer, thereby making different attention score for embedding crossing. This improves the similarity prediction of the text retrieval unit 126. The BERT model is illustrated in FIG. 4.

At step 206, the image retrieval unit 128 may perform the image retrieval method. The image retrieval unit 128 may determine the top y images. The image retrieval unit 128 may generate a visual embedding vector for an image and a sematic embedding vector for the query. The image retrieval unit 128 may determine the similarity between the visual embedding vector and the semantic embedding vector.

According to a non-limiting embodiment, the image retrieval method is expressed as follows:

$\varphi(i;\theta_\varphi) \in R^{D_\varphi}$ be a feature-based representation computed from image i→Visual Embedding Vector $\psi(t;\theta_\psi) \in R^{D_\psi}$ be a feature-based representation of text t→Semantic Embedding Vector where $\theta_\varphi$ and $\theta_\psi$ denote model parameters In an embodiment, vector mappings into the joint embedding space be defined by linear projections:

$$f(i;W_f,\theta_\varphi) = W_f^T \varphi(i;\theta_\varphi)$$

$$g(t;W_g,\theta_\psi) = W_g^T \psi(t;\theta_\psi) \text{ where } W_f \in R^{D_\varphi \times D} \text{ and } W_g \in R^{D_\psi \times D}$$

In an embodiment, the similarity function in the joint embedding space to be the inner product is determined as:

$$^1s(i,t) = f(i;W_f,\theta_\varphi) \cdot g(t;W_g,\theta_\psi)$$

Figure 5:
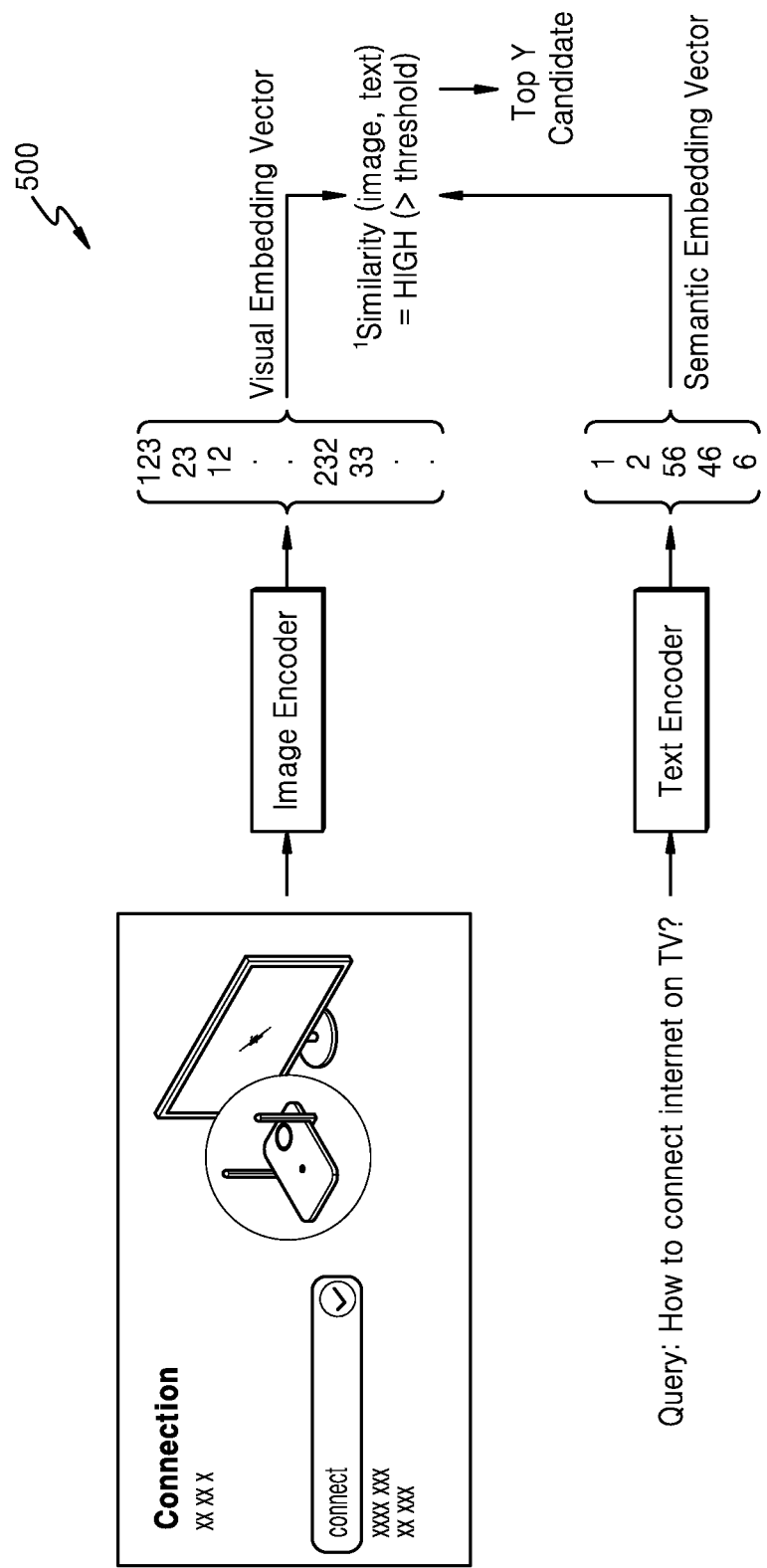
FIG. 5 is a flow diagram for retrieving top y images according to an embodiment.

The image retrieval method according to an embodiment is shown in FIG. 5.

Figure 6:
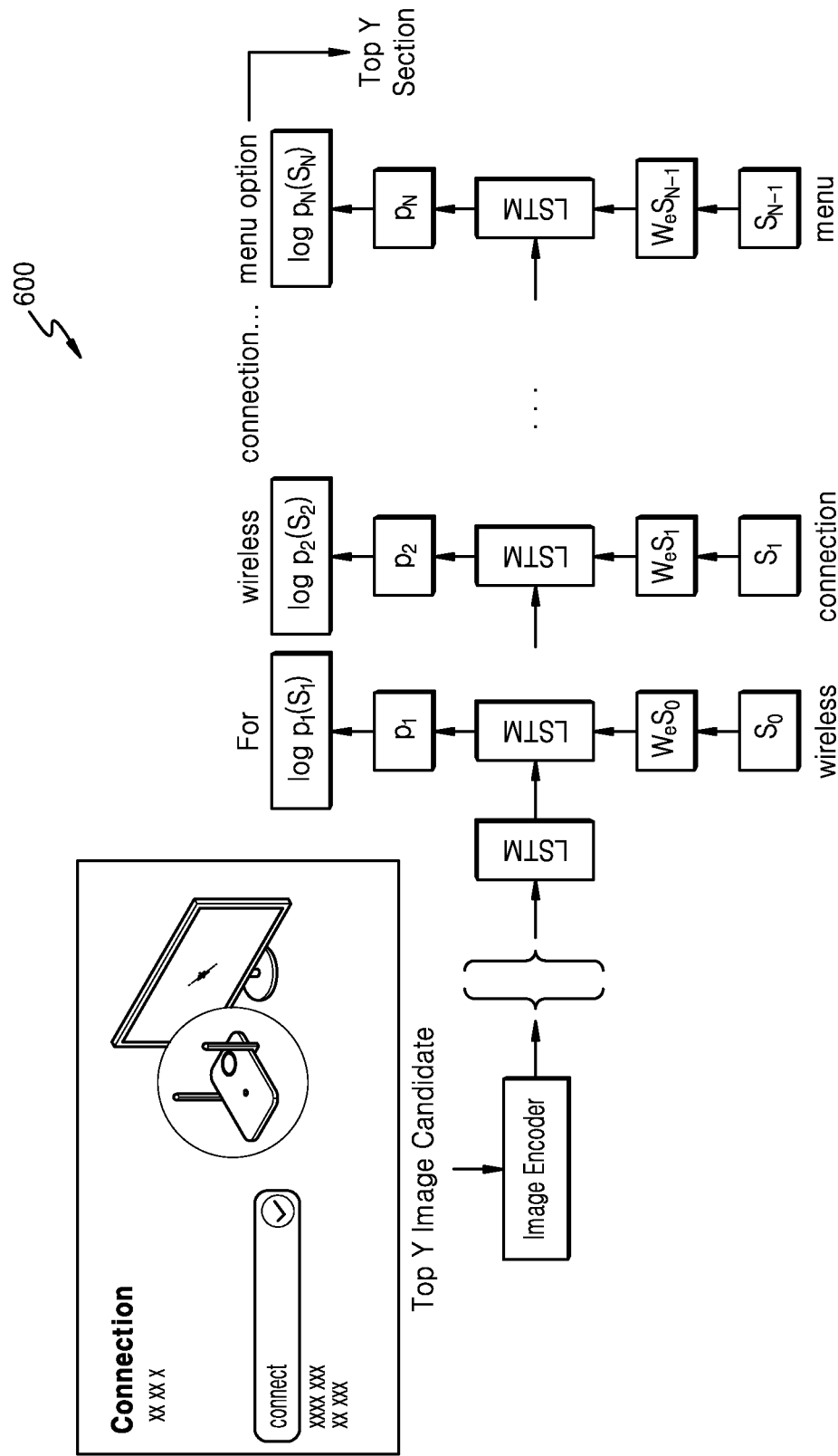
FIG. 6 is a diagram showing a pre-trained encoder for retrieving top y image-text sections according to an embodiment.

At step 208, the image to text converter 130 may generate the image-text sections. Here, each image of the top y images is passed through a description generation module which converts the image into textual form by employing image captioning techniques and returns a textual description of the image to generate the top y image-text sections. The description generation according to an embodiment for the top y images is shown in FIG. 6.

Figure 7:
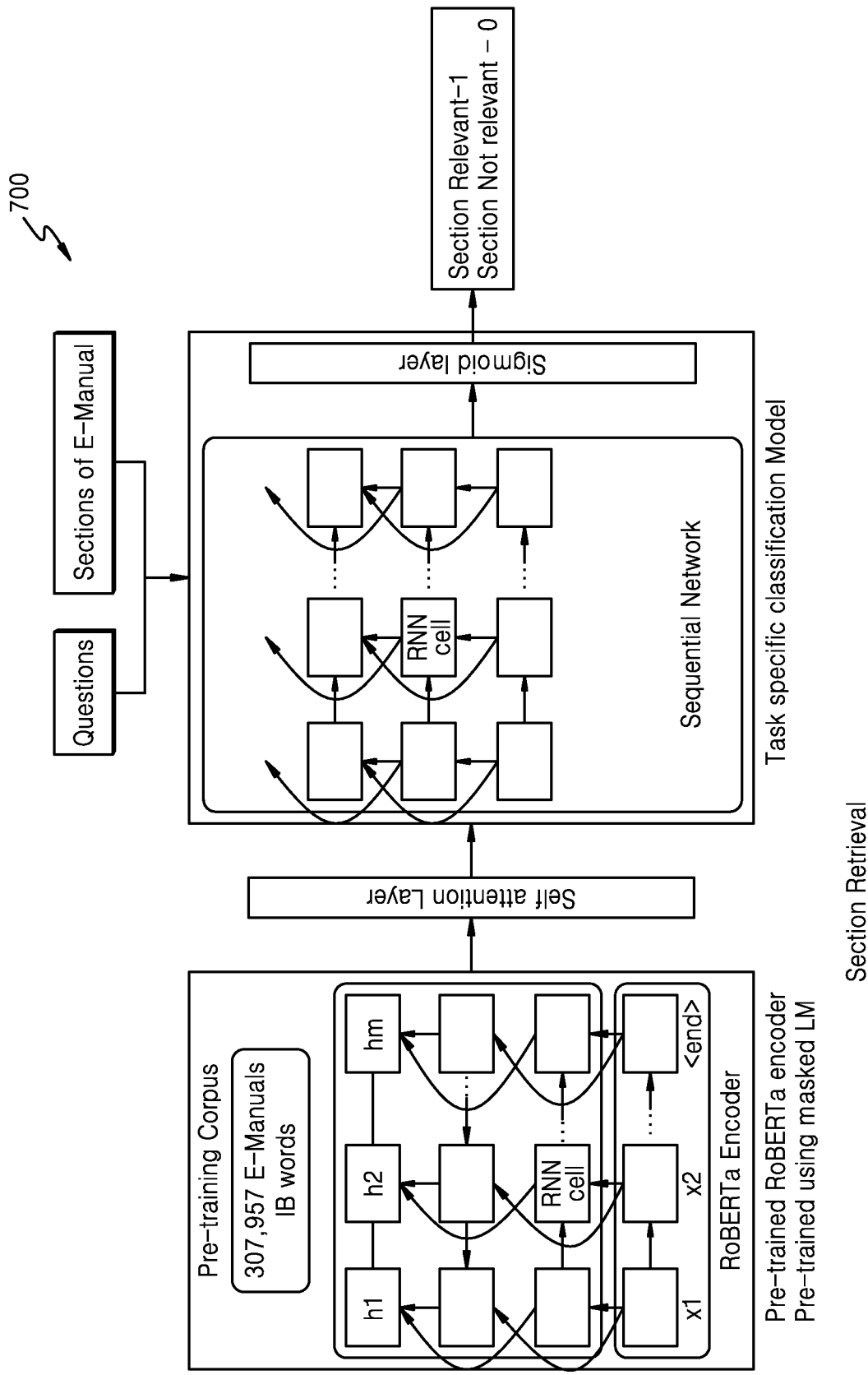
FIG. 7 is a diagram showing a domain-specific pre-trained encoder in a section retrieval unit according to an embodiment.

At steps 210-212, the section retrieval unit 134 may determine the sections most relevant to the query using the domain encoder module 142 and the section predictor module 144. In an embodiment, the section retrieval unit 144 is a sequential classification network that includes a domain specific pre-trained encoder Robustly Optimized BERT Pre-training Approach (RoBERTa) with a self-attention layer followed by section prediction which is a task-specific classification layer. The domain encoder module 142 may be pre-trained on large domain corpus of e-manuals of various consumer electronic devices. The encoder may be initialized by one or more model weights of a pre-trained language model. The section predictor module 144 may provide an output to predict whether a section is relevant or not. That is, the section predictor module 144 may output 1 when the section is relevant and 0 when the section is not relevant to the query for each section x ∈D and q. An embodiment of the section predictor module 144 is shown in FIG. 7.

Figure 8:
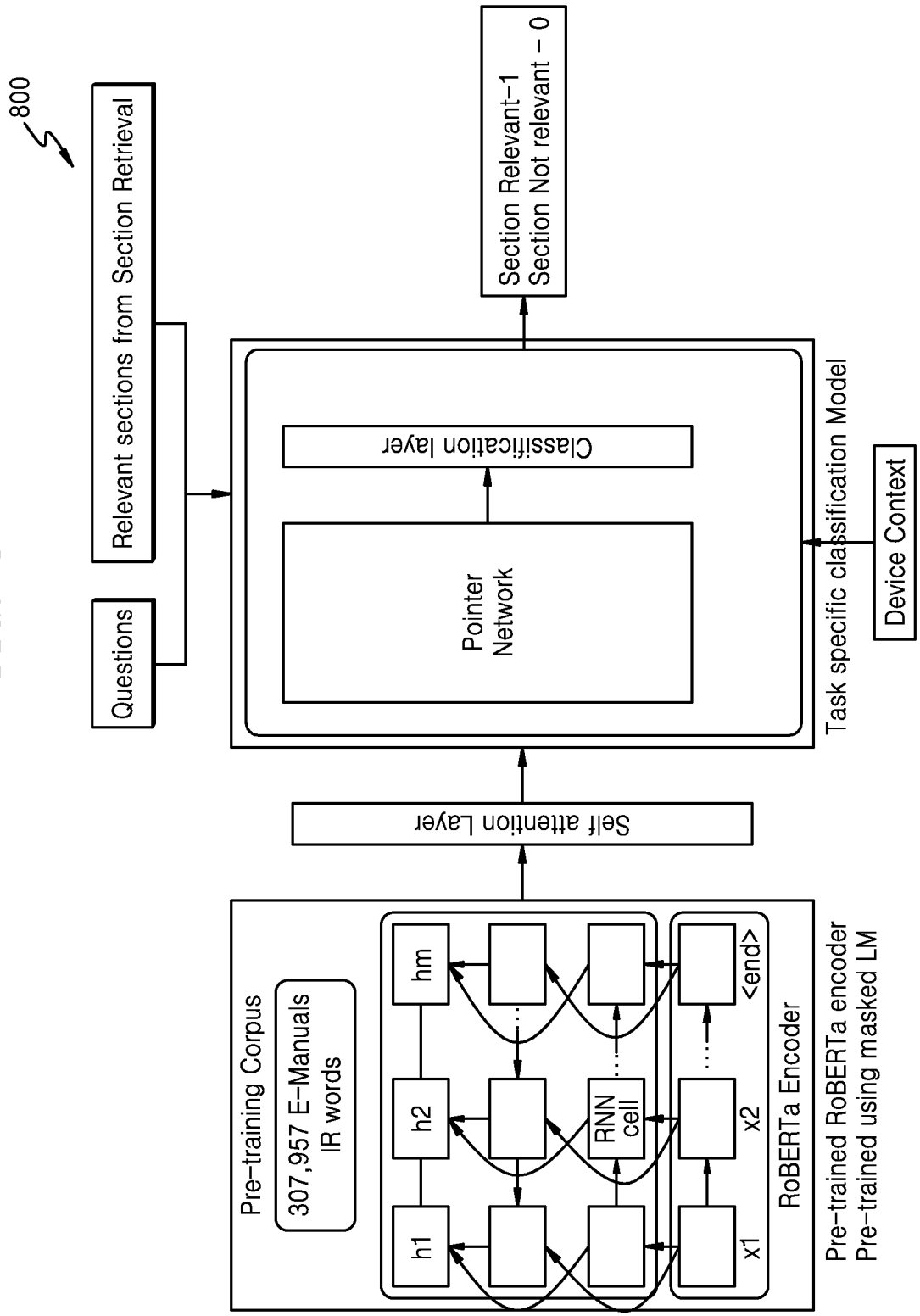
FIG. 8 is a diagram showing a domain-specific pre-trained encoder in an answer retrieval unit according to an embodiment.

At steps 214-216, the answer retrieval unit 136 may generate the answer using the device context module 146 and the answer predictor module 148. In an embodiment, the answer retrieval unit 136 is a sequential classification network that includes the RoBERTa domain-specific pre-trained encoder followed by answer predictor which is a task-specific classification layer conditioned by the context information 154. The device context module 146 may provide the context information 154 to improve relevancy in classification task by ignoring irrelevant sentences or tokens during classification. Examples of the context information 154 include, but are not limited to, sensor states, events, and port values of the electronic device. The answer predictor module 148 may use pointer networks to derive a phrase by predicting start and end indices in the section. The answer predictor module 148 may use two pre-defined settings for sentence-wise and token-wise classification. In case of the sentence-wise classification, the query and each sentence of previously retrieved relevant section may be provided as inputs to answer predictor module 148 which determines whether each sentence or phrase would be part of the answer or not. In the token-wise classification, the sentences may be broken into tokens and each token is evaluated to determine whether the token would be a part of the answer or not. In an example, the answer predictor module 148 may be configured externally to suit nature of content of the e-manual, for instance, if the e-manual contains more text passages or few image-based instruction sections. Accordingly, the answer retrieval unit 136 may provide sentences or tokens as shown in FIG. 8 as the answer. The answer may include complete sections or contiguous/non-contiguous parts or phrases.

Figure 11:
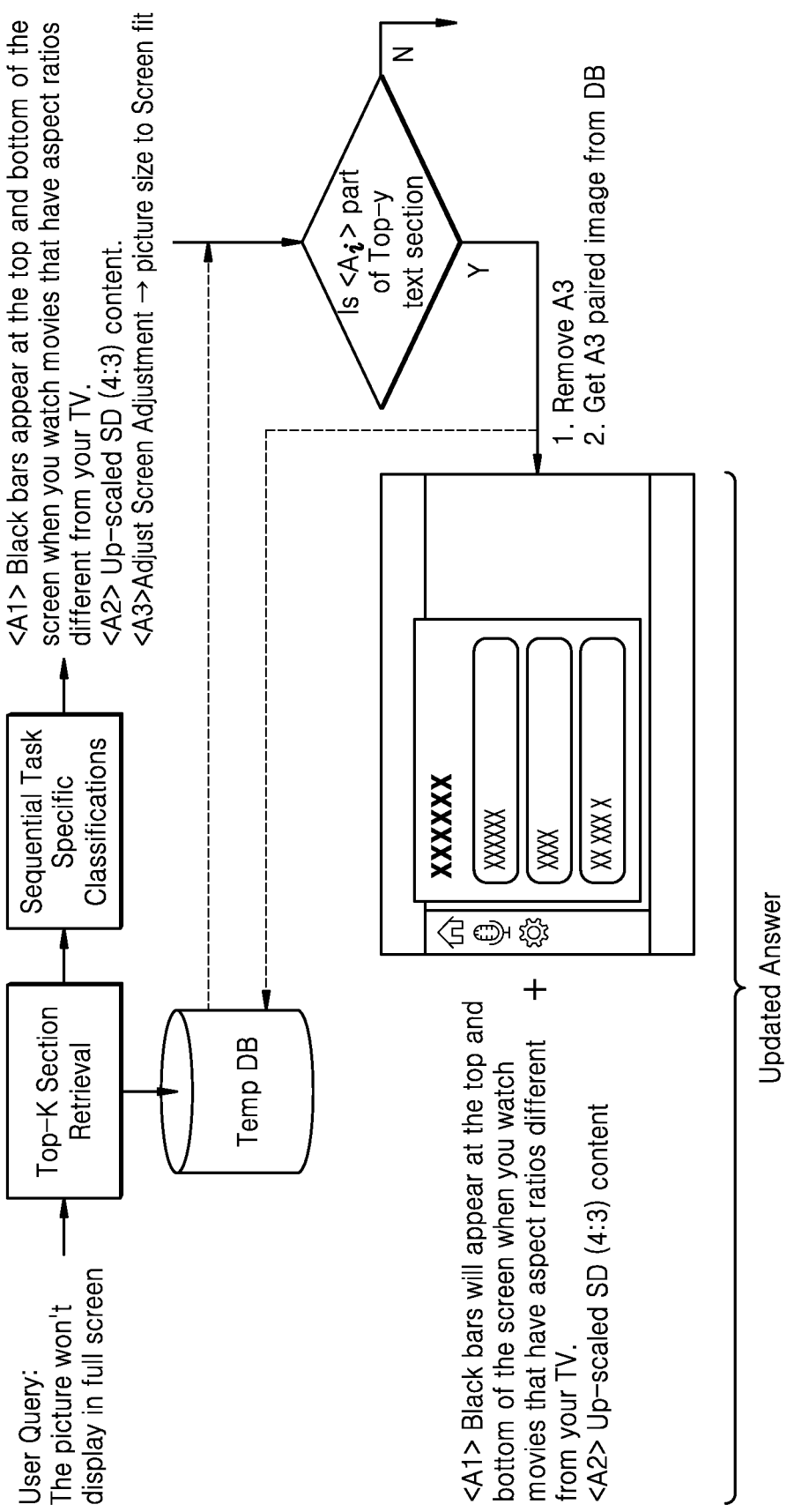
FIG. 11 is a flow diagram for image replacement according to an embodiment.

At step 218, the image replacement unit 158 may check whether the image-text sections are a part of the answer or not by matching the answer with the temporary database. If found, the image replacement unit 158 may remove the image-text section from the answer text and the image-text section with the corresponding image. The image replacement unit 158 may provide remaining parts of the answer to the text correction unit 160 for linguistic correction. An embodiment of the image replacement method is shown in FIG. 11.

Figure 12:
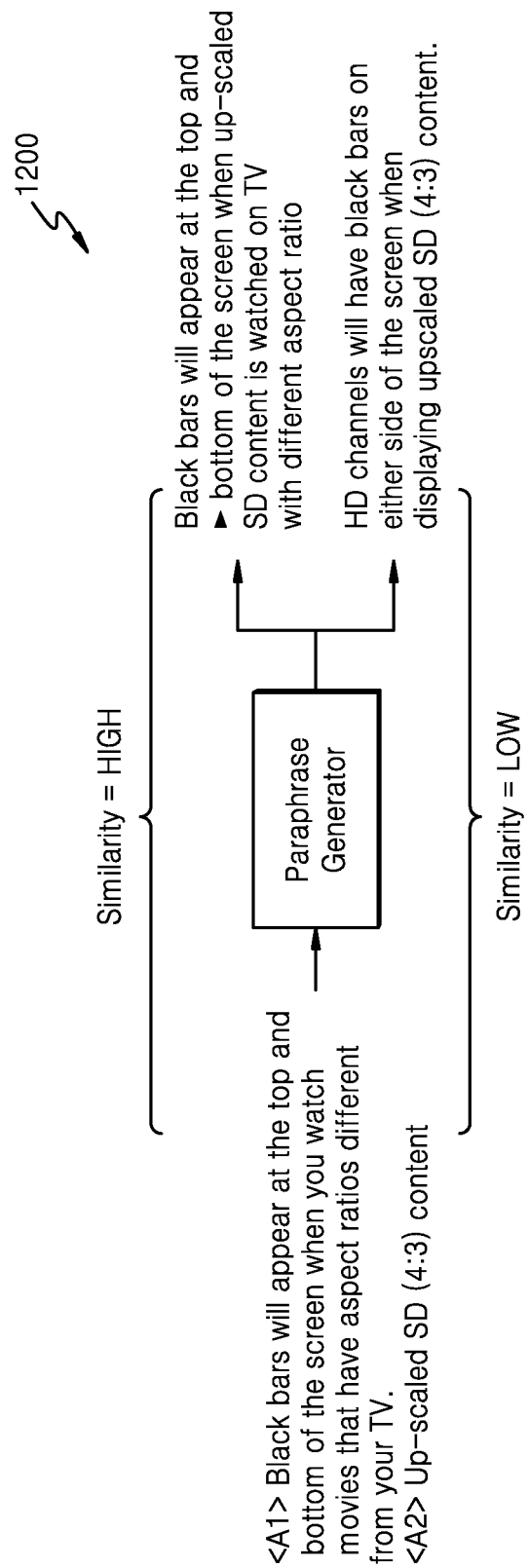
FIG. 12 is a flow diagram for text replacement according to an embodiment.

At step 220, the text correction unit 160 may correct one or more parts of the answer for semantic or grammatical propriety. The text correction unit 160 may correct continuity and grammar of the answer as the parts of the answer may belong to multiple non-contiguous sections. The text correction unit 160 may include a generator module to generate paraphrases of the text sections and may check for similarity with the answer. The text correction unit 160 may provide most similar paraphrased texts to the combination unit 160. An embodiment of the text correction is shown in FIG. 12.

At step 222, the combination unit 162 the may sequence the paraphrased texts and the images to form the final answer. The final answer may be a multimodal answer that includes both: text and images.

At step 224, the output unit 106 may provide the final answer to the user.

Figure 3:
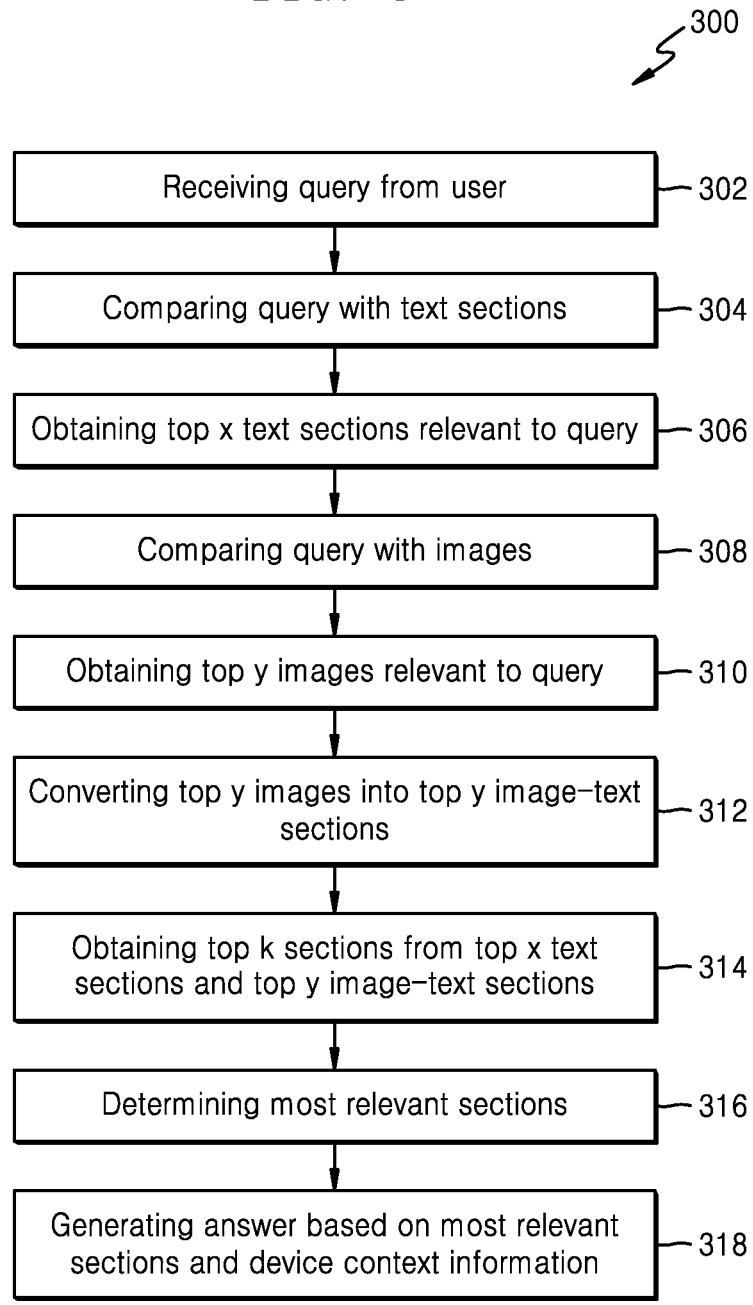
FIG. 3 is a flow chart for an information retrieval method according to an embodiment.

FIG. 3 is a flow chart for the information retrieval method 300 according to an embodiment.

At step 302, the input unit 104 may receive the query from the user.

At step 304, the text retrieval unit 126 may compare the query with the text sections in the instructional document 150.

At step 306, the text retrieval unit 126 may obtain the top x text sections relevant to the query using the pre-trained encoder.

At step 308, the image retrieval unit 128 may compare the query with the images in the instructional document 150.

At step 310, the image retrieval unit 128 may obtain the top y images relevant to the query.

At step 312, the image to text converter 130 may convert the top y images into the top y image-text sections.

At step 314, the top k section retrieval unit 132 may obtain the top k sections from the top x sections and the top y image-text sections.

At step 316, the section retrieval unit 134 may determine the most relevant sections from the top k sections using the domain-specific pre-trained encoder and the sequential classification model.

At step 318, the answer retrieval unit 136 may generate the answer based on the most relevant sections and the context information 154.

FIG. 4 shows a pre-trained encoder 400 for retrieving the top x text sections in accordance with an embodiment. The pre-trained encoder 400 may use the BERT model. The pre-trained encoder 400 may receive the query and the text sections as input to the BERT model. The BERT model may also receive feedback from TF-IDF. The BERT model may generate multiple embeddings to determine cosine similarity between the query and the text sections.

FIG. 5 is a flow diagram 500 for retrieving the top y images according to an embodiment. In the image retrieval method, the image retrieval unit 128 may receive the query and the images of the instructional document 150. An image encoder of the image retrieval unit 128 may process the images to generate the visual embedding vector. A text encoder of the image retrieval unit 128 may process the query to generate the semantic embedding vector. The image retrieval unit 128 may determine the image to be relevant to the query when the similarity between the visual embedding vector and the semantic embedding vector exceeds a pre-defined threshold.

FIG. 6 is a diagram showing the pre-trained encoder (600) for retrieving the top y image-text sections according to an embodiment. The pre-trained encoder 600 may receive the top y images as inputs to multiple Long Short-Term Memory (LSTM) networks to generate the top y image-text sections.

FIG. 7 is a diagram showing the domain-specific pre-trained encoder 700 in the section retrieval unit 134 according to an embodiment. The domain-specific pre-trained encoder 700 may include a self-attention layer and a sigmoid layer. The domain-specific pre-trained encoder 700 may be RoBERTa encoder that is pre-trained using masked language modeling (LM). The domain-specific pre-trained encoder 700 may use a task-specific classification model that receives the query and the text sections/the image-text sections to determine whether the text sections/the image-text sections are relevant to the query or not relevant to the query. The domain-specific pre-trained encoder 700 may provide "1" as output for relevant sections and "0" for non-relevant sections.

FIG. 8 is a diagram showing the domain-specific pre-trained encoder 800 in the answer retrieval unit 138 according to an embodiment. The domain-specific pre-trained encoder 800 may include a self-attention layer and a task-specific classification model. The task-specific classification model may receive the query and the most relevant sections as inputs and may provide the sentences/the tokens as output, which form the answer provided to the response generation unit 140.

Figure 9:
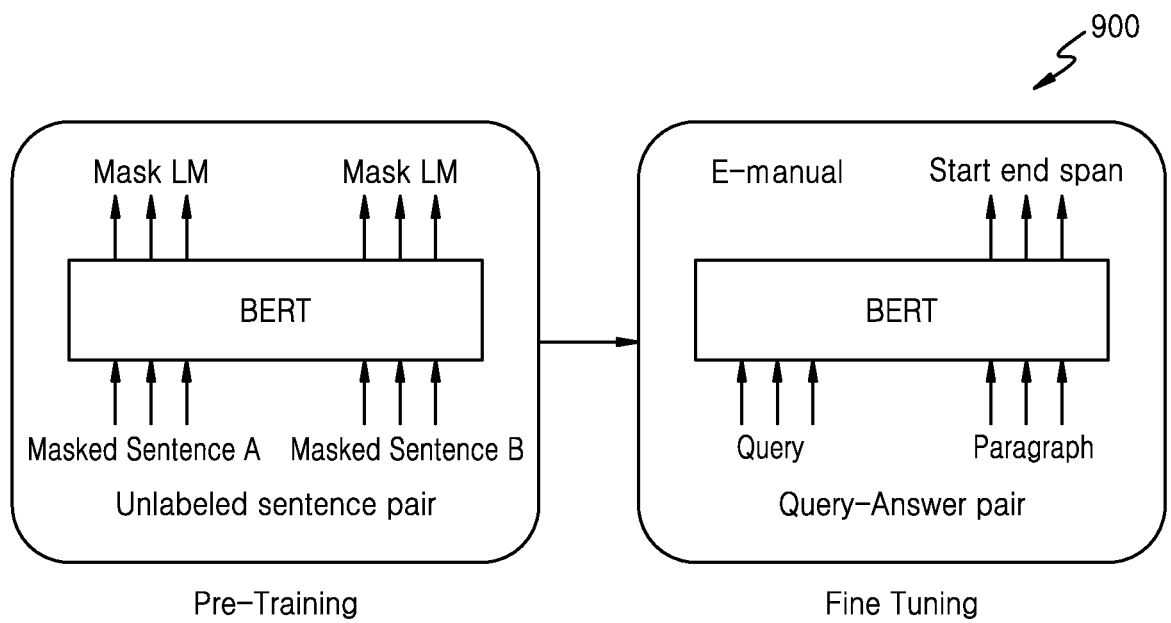
FIG. 9 is a diagram showing a domain-specific pre-trained encoder according to an embodiment.

FIG. 9 is a diagram showing the domain-specific pre-trained encoder 900 according to an embodiment. The domain-specific pre-trained encoder 900 may be a two-step encoder. A first step of the domain-specific pre-trained encoder 900 may be the BERT model that uses unlabeled sentence pairs for pre-training. A second step of the domain-specific pre-trained encoder 900 may be the BERT model that performs fine tuning on pairs of queries-answers.

The section retrieval unit 134 and the answer retrieval unit 136 may be trained simultaneously based on the training and testing data 156 and the instructional document 150. This helps the domain-specific pre-trained encoder 900 to build a combined and hierarchical understanding of question answering at a global level (section) and a local level (sentence/token). Conventional techniques apply a span-based selection approach for extracting answers, whereas the answers to questions on e-manuals are usually non-contiguous. Therefore, the answer retrieval unit 136 may include a transformer-based encoder layer in pipeline which is shared by both, the section retrieval and answer retrieval tasks.

The section retrieval unit 134 may determine one or more model weights of the domain-specific pre-trained encoder model 900. These model weights are used to train the sequential classification model. Here, initial weights of the domain-specific pre-trained encoder 900 are copied from the model weights obtained by pre-training large e-manual corpus. This helps to predict the answers to the questions using extractive techniques.

The RoBERTa model may apply two pre-training strategies to efficiently capture both: generic and domain-specific knowledge required to answer the query: a learning rate strategy and an elastic weight consolidation strategy.

In the learning rate strategy, the RoBERTa model may use a learning rate that linearly decreases by a constant factor from one layer to the next, with an outermost language modeling head layer having maximum learning rate. This acts as a regularizer, as it enforces a constraint that outer layers adapt more to the e-manual domain, while the inner layers' weights do not change much, thus restricting the inner layers to retain knowledge of generic domain primarily.

The elastic weight consolidation strategy mitigates catastrophic forgetting while switching from the generic domain on which original RoBERTa was pre-trained to the domain of e-manuals.

Figure 10:
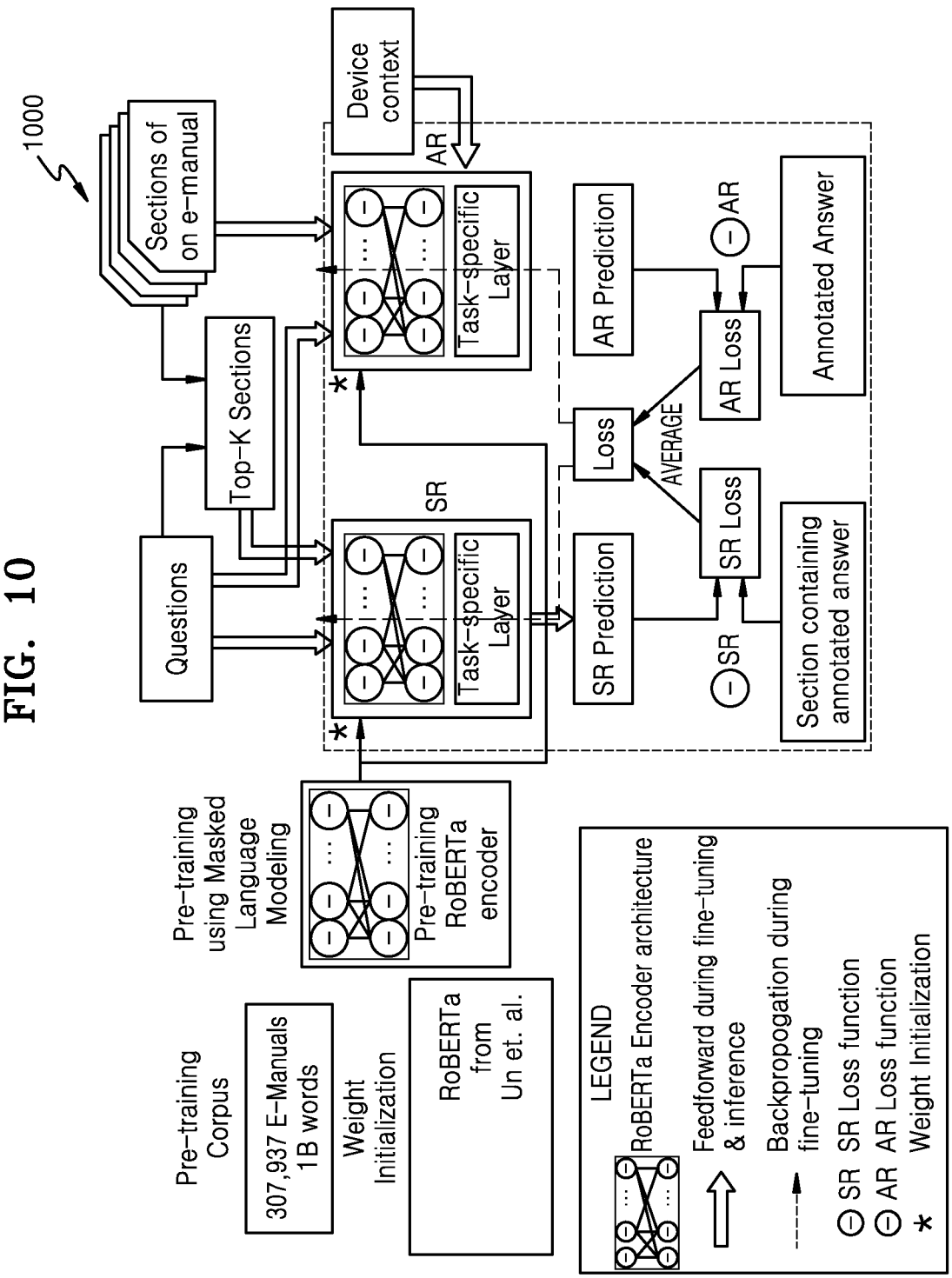
FIG. 10 is a diagram showing a sequential classification model according to an embodiment.

FIG. 10 is a diagram of a sequential classification model 1000 according to an embodiment. Given the query, the sequential classification model 1000 may perform a feed-forward approach for each section retrieved by unsupervised top k section retrieval method. During sentence-wise classification, section retrieval model task classification layer may receive the query and current section as input, and answer retrieval model task classification layer receives the query and each sentence from the current section as input. During token-wise classification, the section retrieval and answer retrieval models may both receive the query and the current section as input for the respective task classification layers. Targets are to set to 1 or 0 as per the relevance of the sentences or tokens. Both the section retrieval model and the answer retrieval model may be initialized by the weights of the pre-trained language model. During backpropagation, a multi-task loss (LMT) is an average of losses for the section retrieval and answer retrieval based on the following Equation 1.

$$L_{MT}(\theta) = \frac{L_{SR} + L_{AR}}{2} \quad \text{[Equation 1]}$$

FIG. 11 is a flow diagram 1100 for image replacement according to an embodiment.

The image replacement unit 128 may check if any part of the answer matches with the image-text mapping data 152 stored in the database 138. If a part of the answer matches with the image-text mapping data 152, the image replacement unit 128 may replace the part of the answer with the image corresponding to the image-text section.

FIG. 12 is a flow diagram 1200 for text replacement according to an embodiment. The text correction unit 160 may include a paraphraser that generates the paraphrased text with high similarity with the query.

Figure 13:
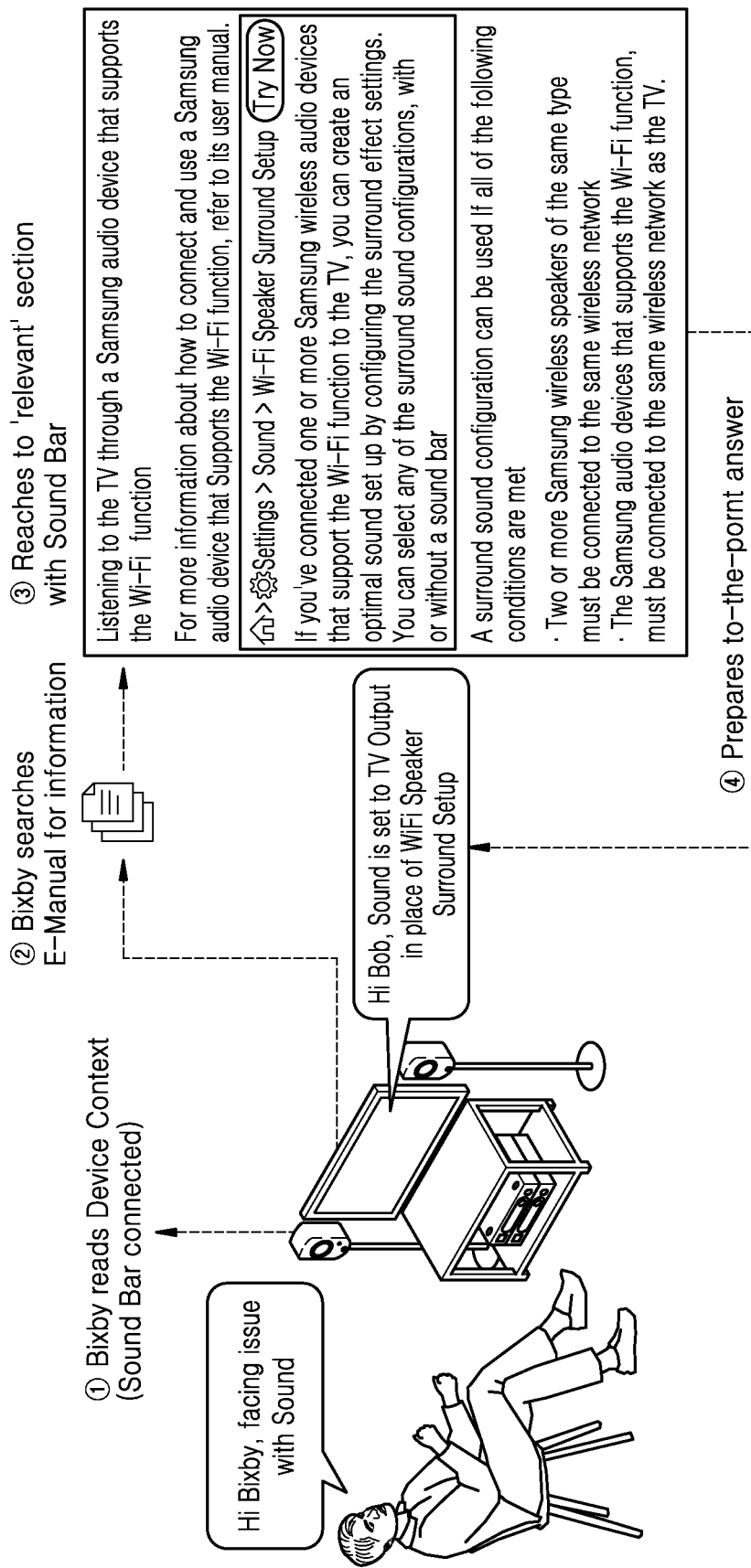
FIG. 13 is a diagram showing a use case for a voice search according to an embodiment.

FIG. 13 is a diagram showing a use case for a voice search according to an embodiment. In this use case, a user provides a query in form of a voice input to a Samsung® smart television having Bixby® voice assistant. Here, the information retrieval method is performed by the Bixby® voice assistant.

In the case of FIG. 13, the user provides the query " . . . facing sound issue". The smart television retrieves relevant information form the e-manual of the smart television. The smart television then generates an answer based on the relevant information and provides the answer to the user by way of a sound bar connected with the smart television.

FIG. 14 is a diagram showing a use case for a chat bot according to an embodiment. In this use case, a user provides a query in form of a text message through a smartphone. The chat bot receives the query and searches for most relevant sections of an e-manual of the smartphone. The chat bot generates an answer based on the most relevant section and provides the answer to the user in form of a text message.

Figure 15:
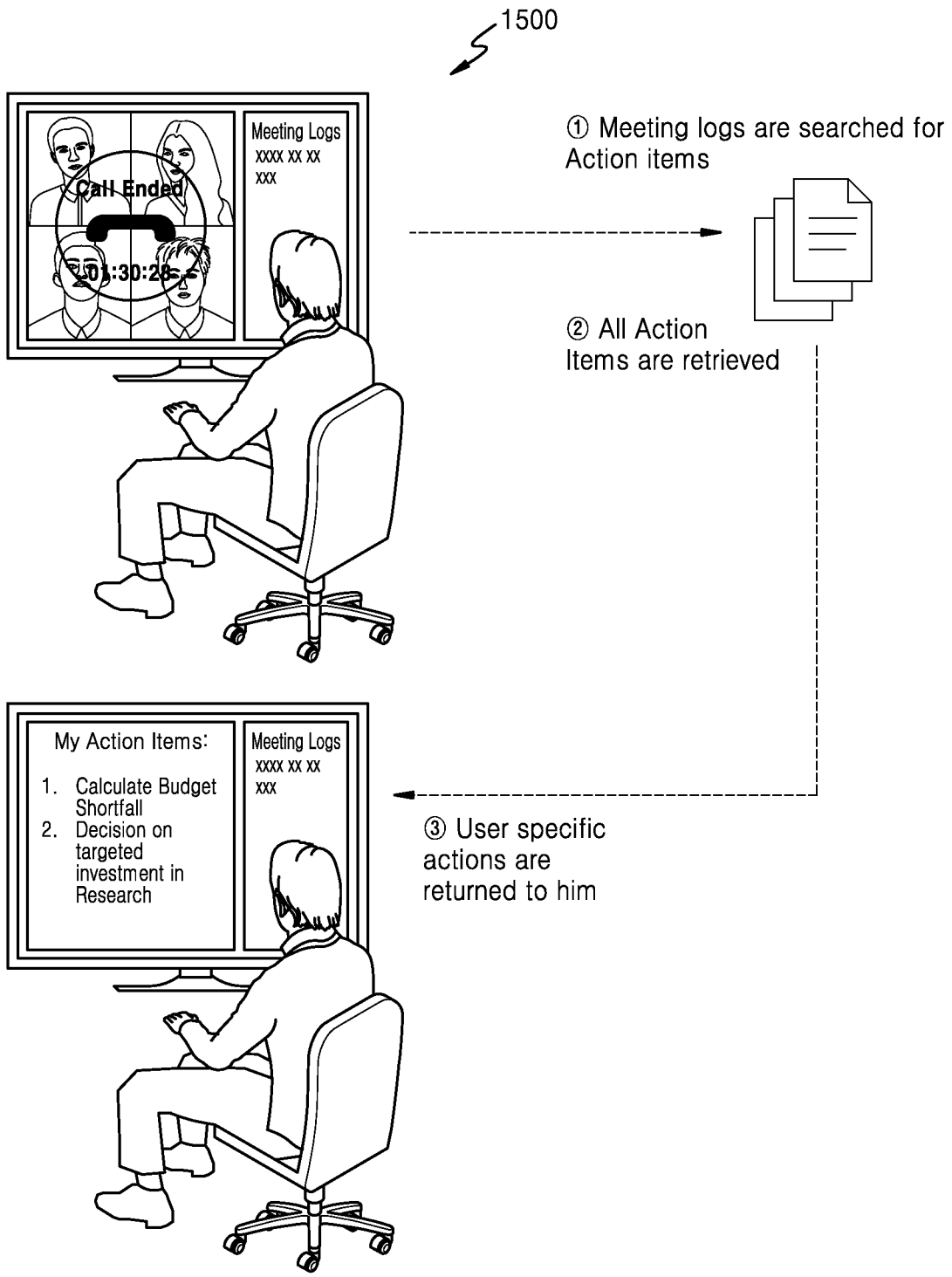
FIG. 15 is a diagram showing a use case for video conferencing according to an embodiment.

FIG. 15 is a diagram of a use case for video conferencing according to an embodiment. In this use case, a user provides voice input to a computer after a video conference ends to know what action items are to be performed by the user. The computer receives the voice input and searches for video conference data stored in the computer. The computer generates a list of information points that are relevant to the user's action items and provides the list to the user.

FIG. 16 is a diagram showing a use case for a family hub according to an embodiment. In this use case, a user asks a query related to a recipe to a smart refrigerator. The smart refrigerator searches for matching recipes and determines most relevant steps of the recipes. The smart refrigerator generates and provides an answer based on the most relevant recipe steps.

Figure 17:
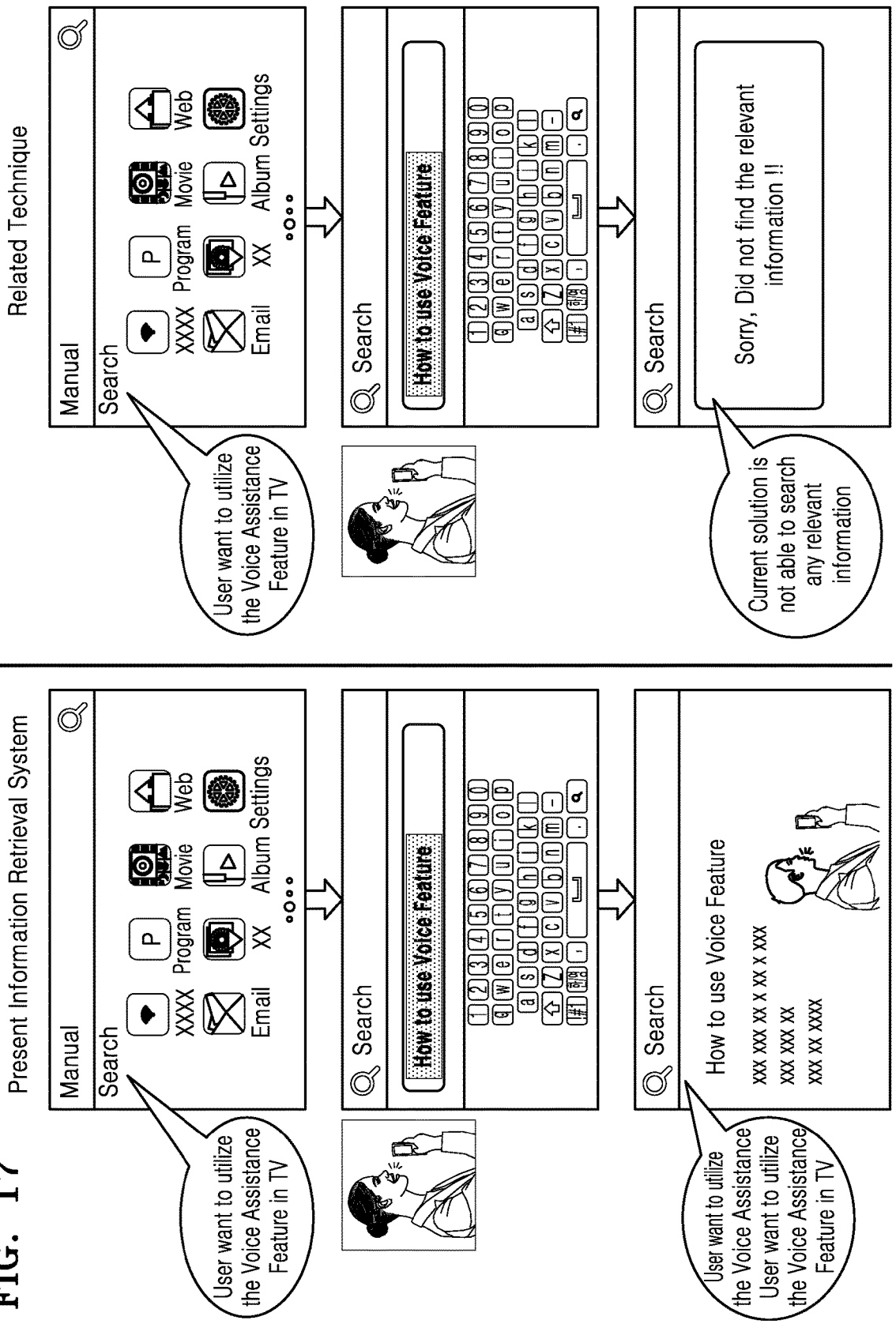
FIGS. 17 through 19 are diagrams showing comparative analyses of the information retrieval system according to an embodiment with related information retrieval techniques.
Figure 18:
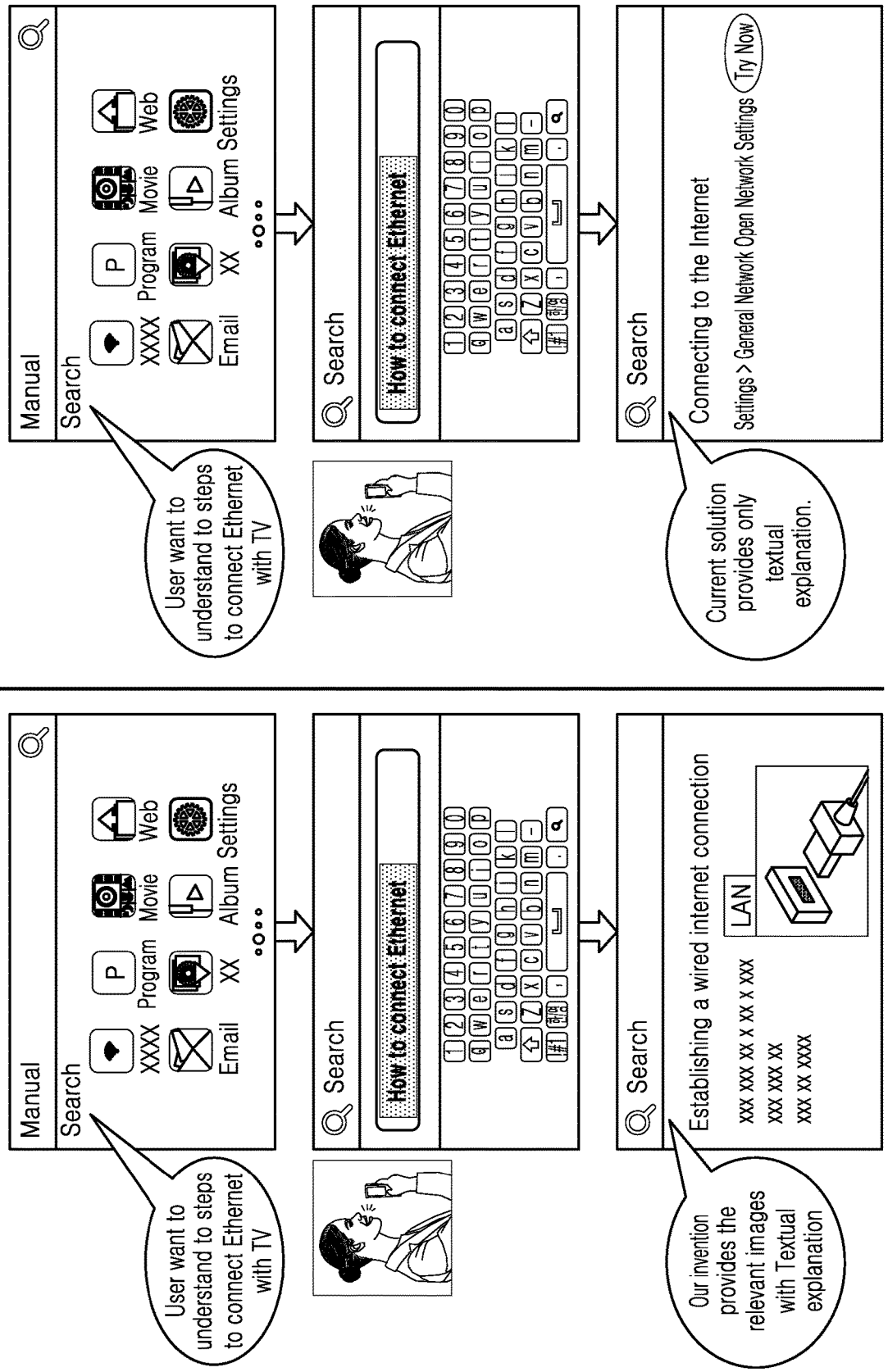
Figure 19:
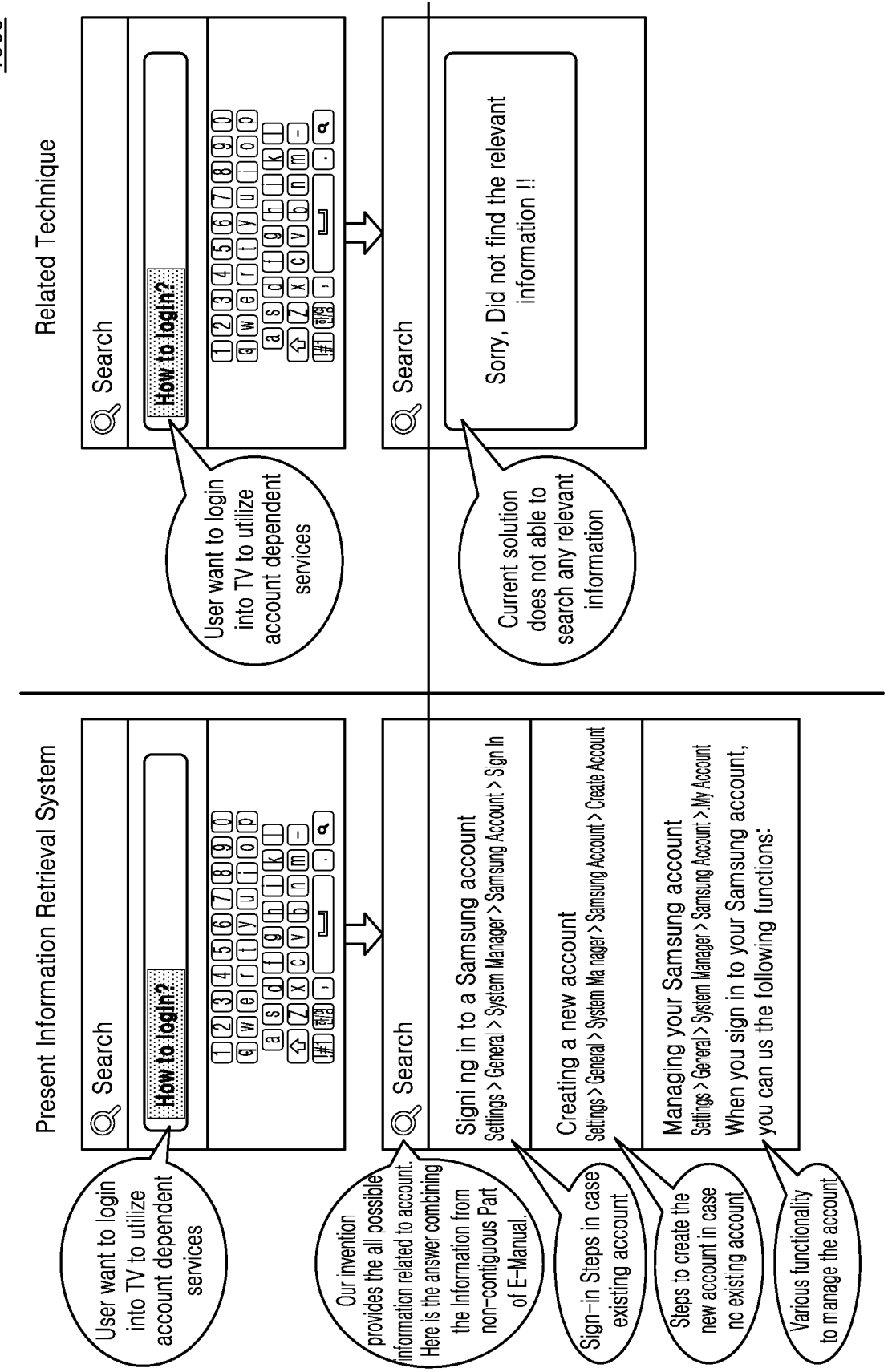

FIGS. 17 through 19 show comparative analyses of the present information retrieval system with related information retrieval techniques.

As shown in FIG. 17, the related technique fails to provide a solution to a query whose answer lies in multiple non-contiguous sections of an e-manual. On the contrary, the present information retrieval system provides accurate answer to the query even when the answer is based on multiple non-contiguous text sections and images of the e-manual.

As shown in FIG. 18, the related technique provides only textual answer. On the contrary, the present information retrieval system provides an answer having both: text and images, thereby simplifying the answer for the user. This helps in saving the user's time and efforts.

As shown in FIG. 19, the related technique fails to provide solutions to a query whose answer requires the user's account information. On the contrary, the present information retrieval system provides accurate and customized answer to the user in most intuitive form based on the user's account information.

Therefore, the FIGS. 17 through 19 show the technical advancement of the information retrieval system over the related information retrieval techniques. Additionally, the information retrieval system of the present invention is easier to use, more intuitive, and a more effective tool to retrieve information than any of the conventional techniques.

In accordance with an embodiment, the information retrieval system identifies and provides top k relevant sections using TF-IDF and transformer model. The information retrieval system captures long range dependencies by fine tuning RoBERTa encoder on domain-specific data. The information retrieval system selects relevant phrases by using multitask learning framework that is employed to sequentially classify relevant sections and identify tokens/sentences within the selected sections for answer completion, thereby providing faster and effective answers to queries.

Further, the information retrieval system provides real-time on-device query resolution system specific to an electronic device in real-time using device procedural document or e-manual. The information retrieval system may be used in smartphones, tablets, computers, smart watches, smart home appliances, etc.

The foregoing description of the invention has been set merely to illustrate the invention and is not intended to be limiting. Since modifications of the disclosed embodiments incorporating the substance of the disclosure may occur to person skilled in the art, the disclosure should be construed to include everything within the scope of the disclosure.

What is claimed is:

1. A system for retrieving information from an instructional document, the system comprising:
a memory storing at least one instruction; and
at least one processor configured to execute the at least one instruction to:
receive a query from a user;
compare the query with one or more text sections in the instructional document;
obtain, from the one or more text sections, top x text sections relevant to the query using a pre-trained encoder;
compare the query with one or more images in the instructional document;
obtain, from the images, top y images relevant to the query;
generate top y image-text sections based on the top y images;
obtain top k sections from the top x text sections and the top y image-text sections;
obtain one or more most relevant sections from the top k sections using a domain-specific pre-trained encoder and a sequential classification model; obtain device context information; and generate an answer based on the one or more most relevant sections and the device context information using the domain-specific pre-trained encoder.

2. The system as claimed in claim 1, wherein the at least one processor is further configured execute the at least one instruction to:
replace at least one part of the answer corresponding to at least one of the top y image-text sections with at least one image of the top y images corresponding to the top y image-text sections;
correct at least one part of the answer corresponding to at least one of the top x text sections grammatically and/or semantically to generate at least one corrected text; and
generate a final answer that includes the at least one image of the top y images and the at least one corrected text.

3. The system as claimed in claim 2, further comprising an output interface configured to provide the final answer to the user.

4. The system as claimed in claim 1, wherein the pre-trained encoder is a Bidirectional Encoder Representations from Transformers (BERT) model trained on the instructional document.

5. The system as claimed in claim 4, wherein the BERT model is combined with Term Frequency-Inverse Document Frequency (TF-IDF) to train on the instructional document.

6. The system as claimed in claim 1, wherein the at least one processor is further configured to execute the at least one instruction to:
obtain a text similarity score for each text section based on a comparison between the text section and the query; and
obtain x text sections having highest text similarity scores as the top x text sections.

7. The system as claimed in claim 6, wherein the at least one processor is further configured to execute the at least one instruction to:
convert the query and the one or more images into a common latent vector space to generate a query vector and one or more image vectors;
obtain an image similarity score for each pair of the query vector and an image vector of the one or more image vectors and
obtain y images having highest image similarity scores as the top y images.

8. The system as claimed in claim 7, wherein the at least one processor is further configured to execute the at least one instruction to compare the text similarity scores of the top x text sections and the image similarity scores of the top y images to determine the top k sections.

9. The system as claimed in claim 1, wherein the domain-specific pre-trained encoder is a Robustly Optimized BERT Pre-training Approach (RoBERTa) model trained on the instructional document.

10. The system as claimed in claim 9, wherein the domain-specific pre-trained encoder is trained simultaneously to obtain the one or more most relevant sections and generate the answer using the RoBERTa model.

11. The system as claimed in claim 10, wherein the RoBERTa model is trained using at least one of: a linearly decreasing learning rate technique, or an elastic weight consolidation technique.

12. The system as claimed in claim 9, wherein the at least one processor is further configured to execute the at least one instruction to obtain the one or more most relevant sections and generate the answer by performing sentence-wise classification and token-wise classification using a task-specific layer of the sequential classification model.

13. The system as claimed in claim 10, wherein an average loss in obtaining the one or more most relevant sections and generating the answer is provided as a multi-task loss to a task-specific layer of the sequential classification model.

14. The system as claimed in claim 1, wherein at least one of the one or more text sections and the one or more images are non-contiguous.

15. The system as claimed in claim 1, wherein the device context information is indicative of at least one of: sensor states, events, or port values.

16. The system as claimed in claim 1, wherein the at least one processor is further configured to execute the at least one instruction to:
obtain one or more model weights of the domain-specific pre-trained encoder; and
train the sequential classification model based on the one or more model weights.

17. The system as claimed in claim 1, wherein the at least one processor is further configured to execute the at least one instruction to convert a voice input into text format to generate the query.

18. A method of retrieving information from an instructional document, the method comprising:
receiving, by at least one processor, a query from a user;
comparing, by the at least one processor, the query with one or more text sections in the instructional document;
obtaining, by the at least one processor and from the one or more text sections, top x text sections relevant to the query using a pre-trained encoder;
comparing, by the at least one processor, the query with one or more images in the instructional document;
obtaining, by the at least one processor and from the one or more images, top y images relevant to the query;
generating, by the at least one processor, top y image-text sections based on the top y images;
obtaining, by the at least one processor, top k sections from the top x text sections and the top y image-text sections;
obtaining, by the at least one processor, one or more most relevant sections from the top k sections using a domain-specific pre-trained encoder and a sequential classification model;
obtaining, by the at least one processor, device context information; and
generating, by the at least one processor, an answer based on the one or more most relevant sections and the device context information using the domain-specific pre-trained encoder.

19. The method as claimed in claim 18, further comprising:
replacing, by the at least one processor, at least one part of the answer corresponding to at least one of the top y image-text sections with at least one image of the top y images corresponding to said top y image-text sections.

20. A non-transitory computer-readable medium storing instructions that, when executed by one or more processors of an electronic device, cause the one or more processors to:
receive a query from a user;
compare the query with one or more text sections in an instructional document;
obtain, from the one or more text sections, top x text sections relevant to the query using a pre-trained encoder;
compare the query with one or more images in the instructional document;

obtain, from the images, top y images relevant to the query;
generate top y image-text sections based on the top y images;
obtain top k sections from the top x text sections and the top y image-text sections;
obtain one or more most relevant sections from the top k sections using a domain-specific pre-trained encoder and a sequential classification model; obtain device context information; and
generate an answer based on the one or more most relevant sections and the device context information using the domain-specific pre-trained encoder.

\* \* \* \* \*